US012526846B2

(12) United States Patent
Sakhnini et al.

(10) Patent No.: US 12,526,846 B2
(45) Date of Patent: Jan. 13, 2026

(54) BEAM REFINEMENT FOR USER EQUIPMENT-DEDICATED ACCESS INFORMATION

(71) Applicant: QUALCOMM Incorporated, San Diego, CA (US)

(72) Inventors: Iyab Issam Sakhnini, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 18/052,051

(22) Filed: Nov. 2, 2022

(65) Prior Publication Data

US 2024/0147535 A1    May 2, 2024

(51) Int. Cl.
*H04W 74/08* (2024.01)
*H04W 74/0833* (2024.01)

(52) U.S. Cl.
CPC .............................. *H04W 74/0833* (2013.01)

(58) Field of Classification Search
CPC .................................................. H04B 7/06958
See application file for complete search history.

(56) References Cited

U.S. PATENT DOCUMENTS

| | | | | |
|---|---|---|---|---|
| 2011/0261777 | A1* | 10/2011 | Maeda | H04W 48/20 |
| | | | | 370/329 |
| 2018/0176958 | A1* | 6/2018 | Islam | H04W 56/00 |
| 2018/0219664 | A1* | 8/2018 | Guo | H04W 24/10 |
| 2020/0007222 | A1* | 1/2020 | Ruder | H04B 7/0837 |
| 2020/0221390 | A1* | 7/2020 | Xu | H04W 52/0212 |
| 2020/0314913 | A1* | 10/2020 | Rastegardoost | H04W 74/04 |
| 2021/0044403 | A1* | 2/2021 | Zhang | H04L 5/0035 |
| 2022/0038334 | A1* | 2/2022 | Siomina | H04L 5/0078 |
| 2022/0070940 | A1 | 3/2022 | Taherzadeh Boroujeni et al. | |

OTHER PUBLICATIONS

International Search Report and Written Opinion—PCT/US2023/075002—ISA/EPO—Jan. 22, 2024.

* cited by examiner

*Primary Examiner* — Pamit Kaur
(74) *Attorney, Agent, or Firm* — Harrity & Harrity, LLP

(57) ABSTRACT

Various aspects of the present disclosure generally relate to wireless communication. In some aspects, a network node may receive, prior to transmitting a user equipment dedicated (UE-dedicated) system information block type 1 (SIB1) associated with a user equipment (UE), a random access channel (RACH) from the UE. The network node may transmit, prior to transmitting the UE-dedicated SIB1 and based at least in part on receiving the RACH, a reference signal that is based at least in part on a beam management procedure. Numerous other aspects are described.

30 Claims, 11 Drawing Sheets

BEAM REFINEMENT FOR USER EQUIPMENT-DEDICATED ACCESS INFORMATION

FIELD OF THE DISCLOSURE

Aspects of the present disclosure generally relate to wireless communication and to techniques and apparatuses for beam refinement for user equipment-dedicated access information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a network node. The method may include receiving, prior to transmitting a user equipment dedicated (UE-dedicated) system information block type 1 (SIB1) associated with a user equipment (UE), a random access channel (RACH) from the UE. The method may include transmitting, prior to transmitting the UE-dedicated SIB1 and based at least in part on receiving the RACH, a reference signal that is based at least in part on a beam management procedure.

Some aspects described herein relate to a method of wireless communication performed by an apparatus of UE. The method may include transmitting, prior to receiving a UE-dedicated SIB1, a RACH using a beam that is based at least in part on a synchronization signal block (SSB). The method may include receiving, prior to receiving the UE-dedicated SIB1 and based at least in part on transmitting the RACH, a reference signal that is based at least in part on a beam management procedure.

Some aspects described herein relate to an apparatus for wireless communication at a network node. The apparatus may include a memory and one or more processors coupled to the memory. The one or more processors may be configured to receive, prior to transmitting a UE-dedicated SIB1 associated with UE, a RACH from the UE. The one or more processors may be configured to transmit, prior to transmitting the UE-dedicated SIB1 and based at least in part on receiving the RACH, a reference signal that is based at least in part on a beam management procedure.

Some aspects described herein relate to an apparatus for wireless communication at a user equipment. The apparatus may include a memory and one or more processors coupled to the memory. The one or more processors may be configured to transmit, prior to receiving a UE-dedicated SIB1, a RACH using a beam that is based at least in part on an SSB. The one or more processors may be configured to receive, prior to receiving the UE-dedicated SIB1 and based at least in part on transmitting the RACH, a reference signal that is based at least in part on a beam management procedure.

Some aspects described herein relate to a non-transitory computer-readable medium that stores a set of instructions for wireless communication by an apparatus. The set of instructions, when executed by one or more processors of the apparatus, may cause the apparatus to receive, prior to transmitting a UE-dedicated SIB1 associated with UE, a RACH from the UE. The set of instructions, when executed by one or more processors of the apparatus, may cause the apparatus to transmit, prior to transmitting the UE-dedicated SIB1 and based at least in part on receiving the RACH, a reference signal that is based at least in part on a beam management procedure.

Some aspects described herein relate to a non-transitory computer-readable medium that stores a set of instructions for wireless communication by an apparatus. The set of instructions, when executed by one or more processors of the apparatus, may cause the apparatus to transmit, prior to receiving a UE-dedicated SIB1, a RACH using a beam that is based at least in part on an SSB. The set of instructions, when executed by one or more processors of the apparatus, may cause the apparatus to receive, prior to receiving the UE-dedicated SIB1 and based at least in part on transmitting the RACH, a reference signal that is based at least in part on a beam management procedure.

Some aspects described herein relate to an apparatus for wireless communication. The apparatus may include means for receiving, prior to transmitting a UE-dedicated SIB1 associated with UE, a RACH from the UE. The apparatus may include means for transmitting, prior to transmitting the UE-dedicated SIB1 and based at least in part on receiving the RACH, a reference signal that is based at least in part on a beam management procedure.

Some aspects described herein relate to an apparatus for wireless communication. The apparatus may include means for transmitting, prior to receiving a UE-dedicated SIB1, a RACH using a beam that is based at least in part on an SSB. The apparatus may include means for receiving, prior to receiving the UE-dedicated SIB1 and based at least in part on transmitting the RACH, a reference signal that is based at least in part on a beam management procedure.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
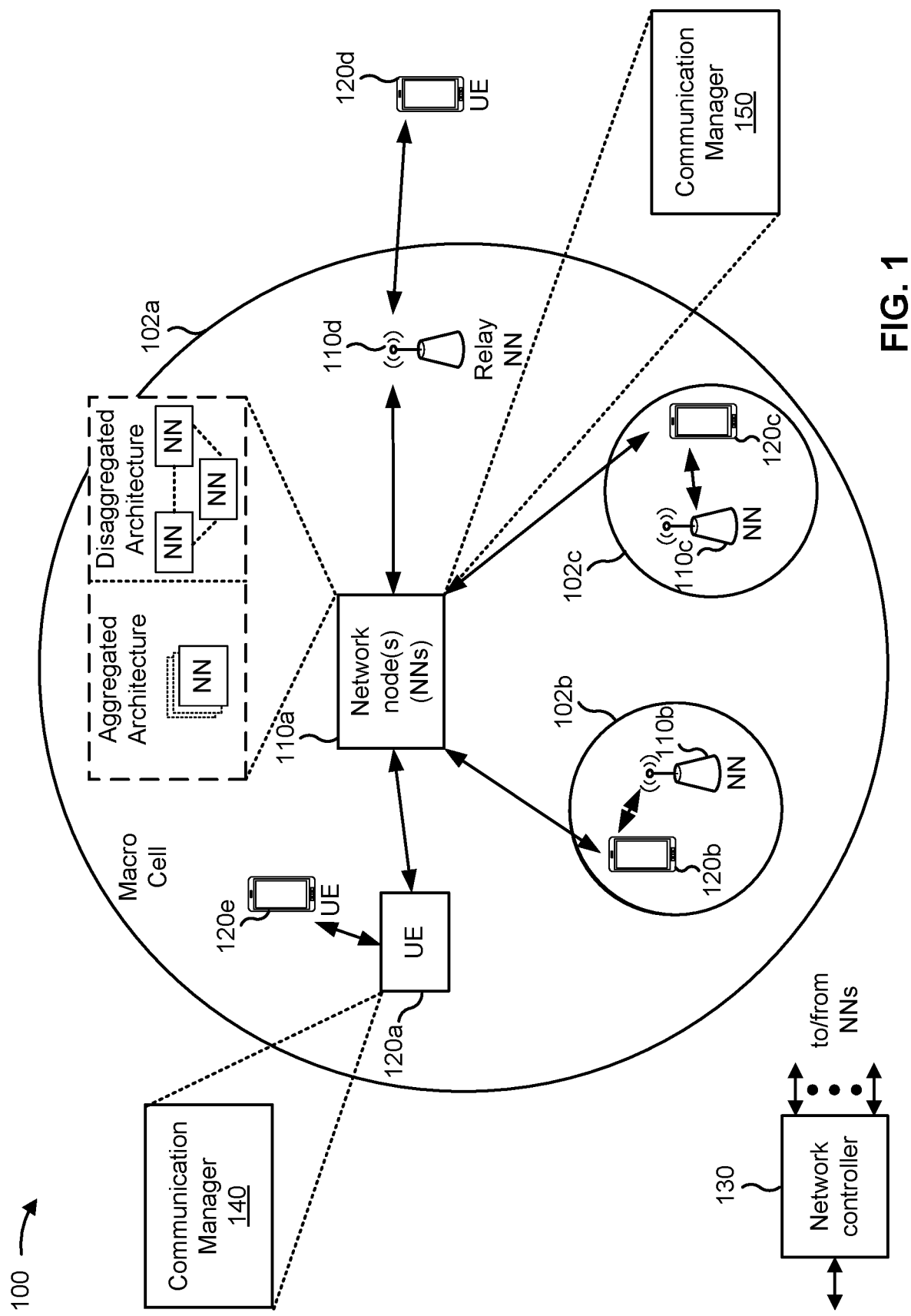
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may receive, prior to transmitting a user equipment dedicated (UE-dedicated) system information block type 1 (SIB1) associated with UE, a random access channel (RACH) from the UE; and transmit, prior to transmitting the UE-dedicated SIB1 and based at least in part on receiving the RACH, a reference signal that is based at least in part on a beam management procedure. Additionally, or alternatively, the communication manager 150 may perform one or more other operations described herein.

In some aspects, a UE (e.g., the UE 120) may include a communication manager 140. As described in more detail elsewhere herein, the communication manager 140 may transmit, prior to receiving a UE-dedicated SIB1, a RACH using a beam that is based at least in part on a synchronization signal block (SSB); and receive, prior to receiving the UE-dedicated SIB1 and based at least in part on transmitting the RACH, a reference signal that is based at least in part on a beam management procedure. Additionally, or alternatively, the communication manager 140 may perform one or more other operations described herein.

As indicated above, FIG. 1 is provided as an example. Other examples may differ from what is described with regard to FIG. 1.

Figure 2:
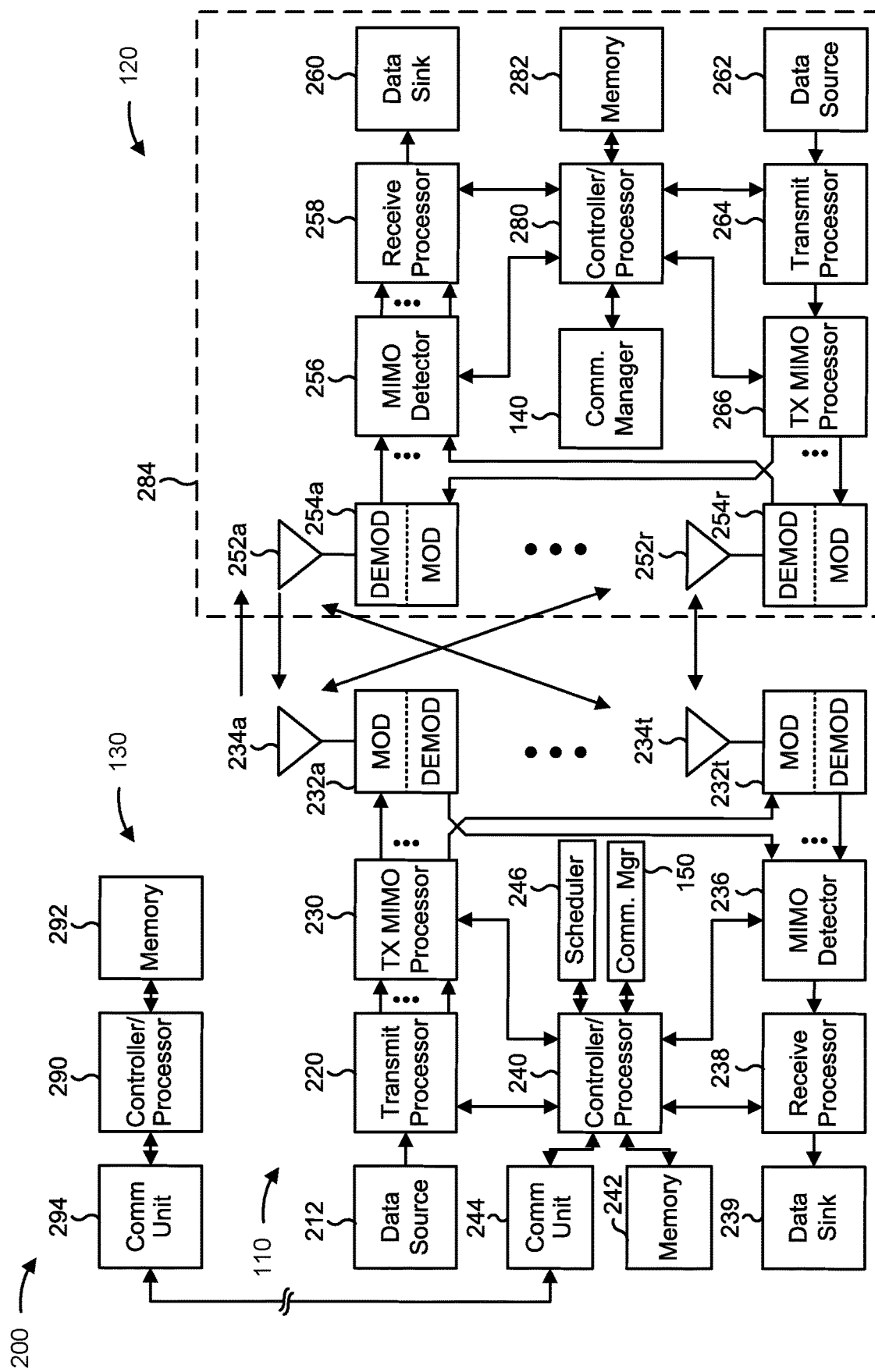
FIG. 2 is a diagram illustrating an example of a network node in communication with a user equipment (UE) in a wireless network, in accordance with the present disclosure.

FIG. 2 is a diagram illustrating an example 200 of a network node 110 in communication with UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the network node 110, the controller/processor 280 of the UE 120, and/or any other component(s) of FIG. 2 may perform one or more techniques associated with beam refinement for user equipment-dedicated access information, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the network node includes means for receiving, prior to transmitting a UE-dedicated SIB1 associated with UE, a RACH from the UE; and/or means for transmitting, prior to transmitting the UE-dedicated SIB1 and based at least in part on receiving the RACH, a reference signal that is based at least in part on a beam management procedure. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for transmitting, prior to receiving a UE-dedicated SIB1, a RACH using a beam that is based at least in part on an SSB; and/or means for receiving, prior to receiving the UE-dedicated SIB1 and based at least in part on transmitting the RACH, a reference signal that is based at least in part on a beam management procedure. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
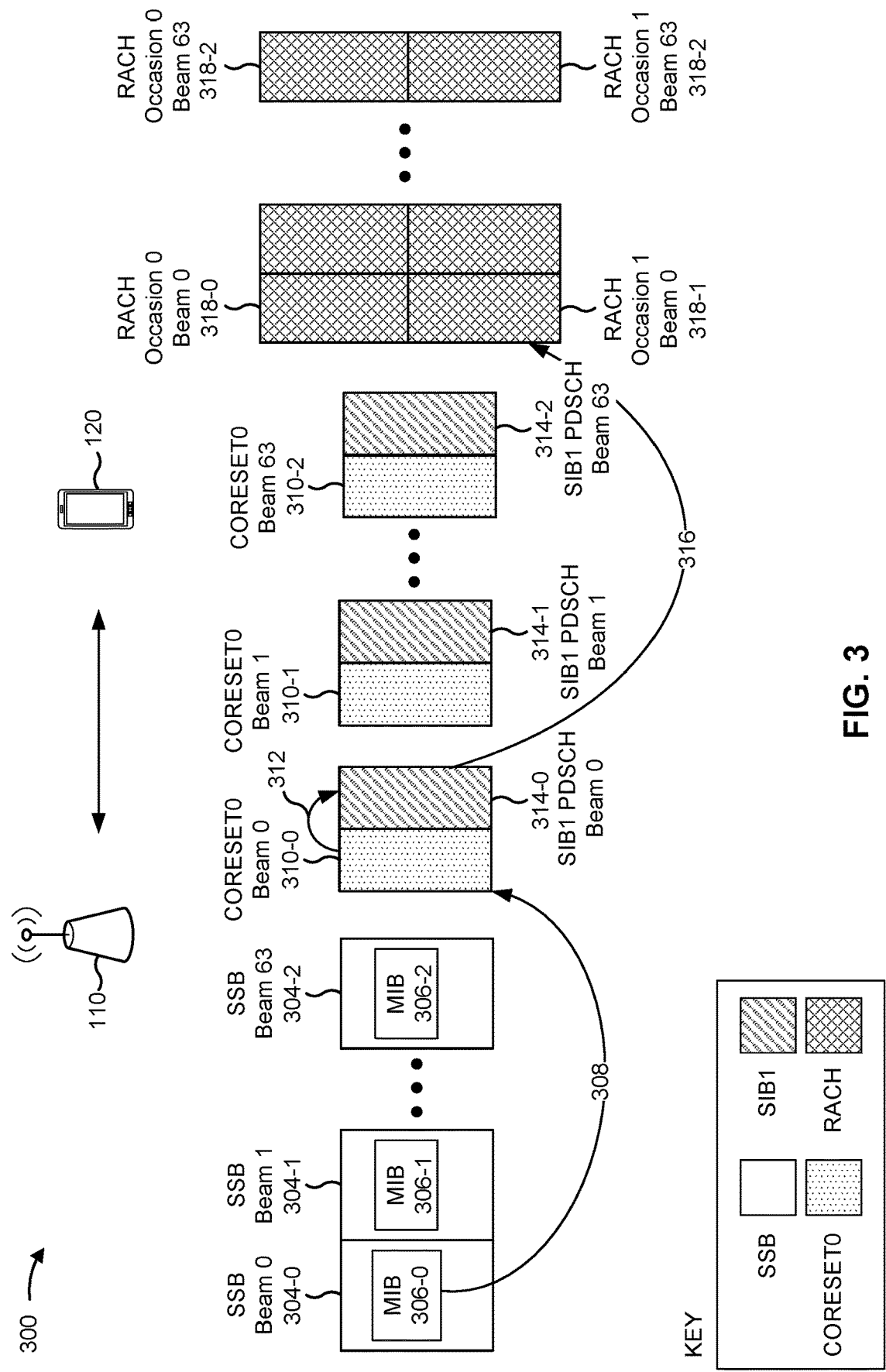
FIG. 3 is a diagram illustrating an example of an access procedure that may be performed by a network node and a UE, in accordance with the present disclosure.

FIG. 3 is a diagram illustrating an example 300 of an access procedure that may be performed by a network node 110 and a UE 120, in accordance with the present disclosure.

An access procedure associated with a wireless network, such as an initial access procedure and/or an initial acquisition procedure, may enable a UE (e.g., the UE 120) to establish a wireless link with a network node operating within the wireless network. In some aspects, and as shown by the example 300, the access procedure may be based at least in part on beams.

To further illustrate, devices operating within the wireless network may use millimeter waves (mmWaves) to transmit information and/or data, such as by using the above-6 GHz frequencies associated with FR1 and/or FR2. Alternatively or additionally, the devices may transmit and/or receive the mmWaves based at least in part on beamforming that concentrates a signal into a particular direction. As one example, a phased array may transmit a signal based at least in part on each antenna using a different phase shift such that the signals transmitted by the phased array constructively and/or destructively combine to generate a signal (e.g., a beam) that propagates in a particular direction. Beamforming may reduce interference within the wireless network and/or improve signal quality at a receiver.

As part of the access procedure shown by the example 300, a network node (e.g., the network node 110) may transmit an SSB using a physical broadcast channel (PBCH) and/or based at least in part on multiple beams. For example, the network node may transmit a first SSB based at least in part on a first beam (e.g., Beam 0) as shown by reference number 304-0, a second SSB based at least in part on a second beam (e.g., Beam 1) as shown by reference number 304-1, up to a $64^{th}$ SSB based at least in part on a $64^{th}$ beam (e.g., Beam 63) as shown by reference number 304-2. In some aspects, the network node may transmit the multiple beams based at least in part on time division multiplexing (TDM) such that the network node transmits Beam 0 at a first time duration, Beam 1 at a second time duration, and/or the Beam 63 at a third time duration. Each beam used for transmitting an SSB may have a different propagation direction relative to other beams. By transmitting the SSB using different beams and, accordingly, different directions, the network node may increase a coverage area of the SSB transmissions and/or increase a probability that a UE (e.g., the UE 120) may receive an SSB.

Each SSB may include a respective master information block (MIB). For instance, the first SSB may include a first MIB 306-0, the second SSB may include a second MIB 306-2, and the $64^{th}$ MIB may include a $64^{th}$ MIB 306-2. An MIB may indicate at least some minimum system information (MSI) that can be used by a UE to receive additional communications from the network node, such as bits that indicate the most significant bites (MSB) of a system frame number and/or sub-carrier spacing associated with a SIB1. In some aspects, and as shown by reference number 308, each MIB may indicate a respective location and/or respective air interface resources of a control resource set zero (CORESET0). For instance, the first MIB 306-0 may indicate a configuration (e.g., a frequency resource and/or a time resource) for a first CORESET0 310-0, the second MIB 306-1 may indicate a configuration associated with a second CORESET0 310-1, and/or the $64^{th}$ MIB 306-2 may indicate a configuration associated with a $64^{th}$ CORESET0 310-2. In some aspects, an MIB may indicate a physical downlink control channel (PDCCH) monitoring occasion within the CORESET0.

A control resource set (CORESET) may denote a set of physical air interface resources (e.g., one or more frequency resources and/or time resources) that may be used by a network node to transmit a PDCCH and/or a physical downlink shared channel (PDSCH). To illustrate, a CORESET may include multiple resource blocks (RBs) in the frequency domain, and either one, two, or three symbols (e.g., OFDM symbols) in the time domain. "CORESET0" may denote a particular CORESET out of multiple CORESETs that may be configured and/or indicated by an MIB. The CORESET0 may alternatively be referred to as a common CORESET and/or may be associated with the transmission of a common message to multiple UEs. In some aspects, PDCCH transmitted based at least in part on using a CORESET0 may include information associated with initial access to a wireless network.

To illustrate, the network node may transmit a first PDCCH based at least in part on using the CORESET0 310-0 and Beam 0, a second PDCCH based at least in part on using the CORESET0 310-1 and Beam 1, up to a $64^{th}$ PDCCH based at least in part on using the CORESET0 310-2 and Beam 63. As shown by reference number 312, the network node may include, in a PDCCH transmission, downlink control information (DCI) that indicates PDSCH resources (e.g., within the respective CORESET0) for a PDSCH transmission that includes the SIB1 (e.g., SIB1 PDSCH). For instance, the first PDCCH associated with the CORESET0 310-0 and Beam 0 may carry first DCI that indicates a configuration and/or air interface resources for SIB1 PDSCH 314-0 (e.g., transmitted using Beam 0), the second PDCCH associated with the CORESET0 310-1 and Beam 1 may carry second DCI that indicates a configuration for SIB1 PDSCH 314-1 (e.g., transmitted using Beam 1), and/or the $64^{th}$ PDCCH associated with the CORESET0 310-2 and Beam 63 may carry $64^{th}$ DCI that indicates a configuration for SIB1 PDSCH 314-2 (e.g., transmitted using Beam 64). The UE may receive a SIB1 based at least in part on the indicated PDSCH configuration and/or beam used to receive the SSB and/or MIB. Alternatively or additionally, the UE may receive the SIB1 based at least in part on using the CORESET0. That is, the configuration for a SIB PDSCH may be based at least in part on an associated CORESET0.

A SIB1 may indicate additional MSI, cell access information, and/or scheduling information for communicating with the network node. For instance, and as shown by reference number 316, a SIB1 received by the UE using the SIB1 PDSCH 314-0 and Beam 0 may indicate one or more RACH parameters and/or one or more physical random access channel parameters (PRACH). A RACH parameter and/or PRACH parameter may include, by way of example and not of limitation, a PRACH configuration index, a PRACH preamble, a received target power, a power ramping step, a frequency domain resource, and/or a time domain resource. In some aspects, a RACH parameter and/or PRACH parameter may indicate a first RACH occasion 0 as shown by reference number 318-0 and/or a first RACH occasion 1 as shown by reference number 318-1. As another example, a SIB1 received by the UE using the SIB1 PDSCH 314-2 and Beam 63 may indicate one or more RACH parameters and/or PRACH parameters associated with a $64^{th}$ RACH occasion 0 as shown by reference number 318-2 and/or a $64^{th}$ RACH occasion 1 as shown by reference number 318-2.

A RACH occasion may be implicitly or explicitly associated with a beam. To illustrate, the first RACH occasion 0 and/or the first RACH occasion 1 may be implicitly associated with Beam 0 based at least in part on the network node transmitting, and/or the UE receiving, the SIB1 using the SIB1 PDSCH 314-0 and Beam 0. Alternatively or additionally, the first RACH occasion 0 and/or the first RACH occasion 1 may be explicitly associated with Beam 0 in a RACH parameter and/or PRACH parameter. Accordingly, as part of the access procedure the UE may transmit an uplink communication to the network based at least in part on using a beam and RACH occasion as decoded by the UE. For instance, the UE may transmit a RACH (e.g., by way of the PRACH) based at least in part on using the first RACH occasion 0, the first RACH occasion 1, and/or Beam 0.

In some aspects, a network node may repeat initial access information on each beam transmission. That is, the network node may transmit initial access information in a first transmission that is based at least in part on a first beam, repeat the initial access information in a second transmission that is based at least in part on a second beam, and continue repeating transmission of the initial access information on other beams up to a $64^{th}$ transmission that is based at least in part on a $64^{th}$ beam. Repeating the initial access information may consume air interface resources that could otherwise be used for other purposes. For instance, repeating SIB1 PDSCH transmissions may consume a larger amount of air interface resources relative to repeating SSB transmissions based at least in part on a first amount of information included in an SIB1 being larger than a second amount of information included in an SSB. To further illustrate, a UE may receive the SIB1 PDSCH transmission exclusively on Beam 0, and refrain from receiving SIB1 PDSCH transmissions using other beams, based at least in part on receiving an SSB on Beam 0. In some aspects, and as described below, a network node may transmit a UE-dedicated SIB1 to the UE instead of repeating SIB1 PDSCH initial access transmissions on multiple beams, which may result in reduced air interface resource consumption.

A network node may select, for transmitting initial access information, a number of beams based at least in part on increasing a coverage area associated with transmitting the initial access information. However, a beam selected by the network node to transmit the initial access information may be sub-optimal for communications between the network node and a particular UE relative to other, additional beams. To illustrate, beam transmissions may provide increased data throughput (relative to omnidirectional transmissions at lower frequencies) when operating in line-of-sight (LoS) conditions between devices, but may be more susceptible to disruption by an obstruction (e.g., a hand placed over an antenna, a building, or foliage) and/or a device moving from a first location with LoS conditions to a second location without the LoS conditions. As part of an initial access procedure, the UE may receive SSB on Beam 0 at a higher power level relative to other beams, and select Beam 0 to communicate with the network node. Although the UE may receive Beam 0 at a higher power level relative to the other beams used for transmitting initial access information, Beam 0 may be sub-optimal relative to additional beams not used to transmit initial access information. For instance, the UE may be operating at a location that is periphery of LoS conditions with the network node, the UE may dynamically experience blockage, and/or the UE may move to a second location after selecting Beam 0. A sub-optimal beam (e.g., a beam that is not LoS between two devices and/or a beam that results in reduced receive power relative to another beam transmitted at a same power) may result in the UE and/or the network node experiencing increased recovery error at a receiver, reduced data throughput, and/or increased data transfer delays.

Some techniques and apparatuses described herein provide beam refinement for user equipment-dedicated access information. In some aspects, a network node may receive, prior to transmitting a UE-dedicated SIB1 associated with a UE, a RACH from the UE. In some aspects, the RACH may be based at least in part on a first beam associated with an SSB transmission. Prior to transmitting the UE-dedicated SIB1, the network node may transmit a reference signal that is based at least in part on a beam management procedure. That is, the network node may transmit the reference signal based at least in part on receiving the RACH and initiating the beam management procedure. Initiating and/or performing a beam management procedure may enable the network node and/or the UE to select a second beam for communications that has improved signal quality (e.g., improved received power) relative to the first beam. The second beam may include a different beam than the first beam and/or a calibrated version of the first beam. The network node may transmit the UE-dedicated SIB1 based at least in part on the second beam.

In some aspects, a UE may transmit, prior to receiving a UE-dedicated SIB1, a RACH using a beam that is based at least in part on an SSB. To illustrate, the UE may receive, prior to transmitting the RACH, the SSB based at least in part on the beam. The UE may alternatively or additionally receive, prior to receiving the UE-dedicated SIB1 and based at least in part on transmitting the RACH, a reference signal that is based at least in part on a beam management procedure. For instance, the UE may receive the reference signal as part of performing the beam management procedure. Performing the beam management procedure may enable the network node and/or the UE to select a second beam for communications that has improved signal quality (e.g., improved received power) relative to the first beam. The UE may receive the UE-dedicated SIB1 based at least in part on the second beam.

The use of a UE-dedicated SIB1 enables a network node to reduce repetition of initial access information, preserve air interface resources, and direct an SIB to a specific UE. Because the network node may direct a communication to a specific UE, the network node may initiate and/or perform a beam management procedure with the specific UE. Performing a beam management procedure as part of an access procedure, such as a beam refinement procedure that selects a refinement (e.g., a calibration and/or a change in propagation direction) to an existing beam may enable a network node to transmit, and/or a UE to receive, a UE-dedicated SIB1 using a beam with improved signal quality relative to another beam used to transmit an SSB. Alternatively or additionally, the network node and the UE may use the beam with improved signal quality for additional communications. The improved signal quality may reduce recovery errors at a receiver, increase data throughput, and/or reduce data transfer delays.

As indicated above, FIG. 3 is provided as an example. Other examples may differ from what is described with respect to FIG. 3.

Figure 4A:
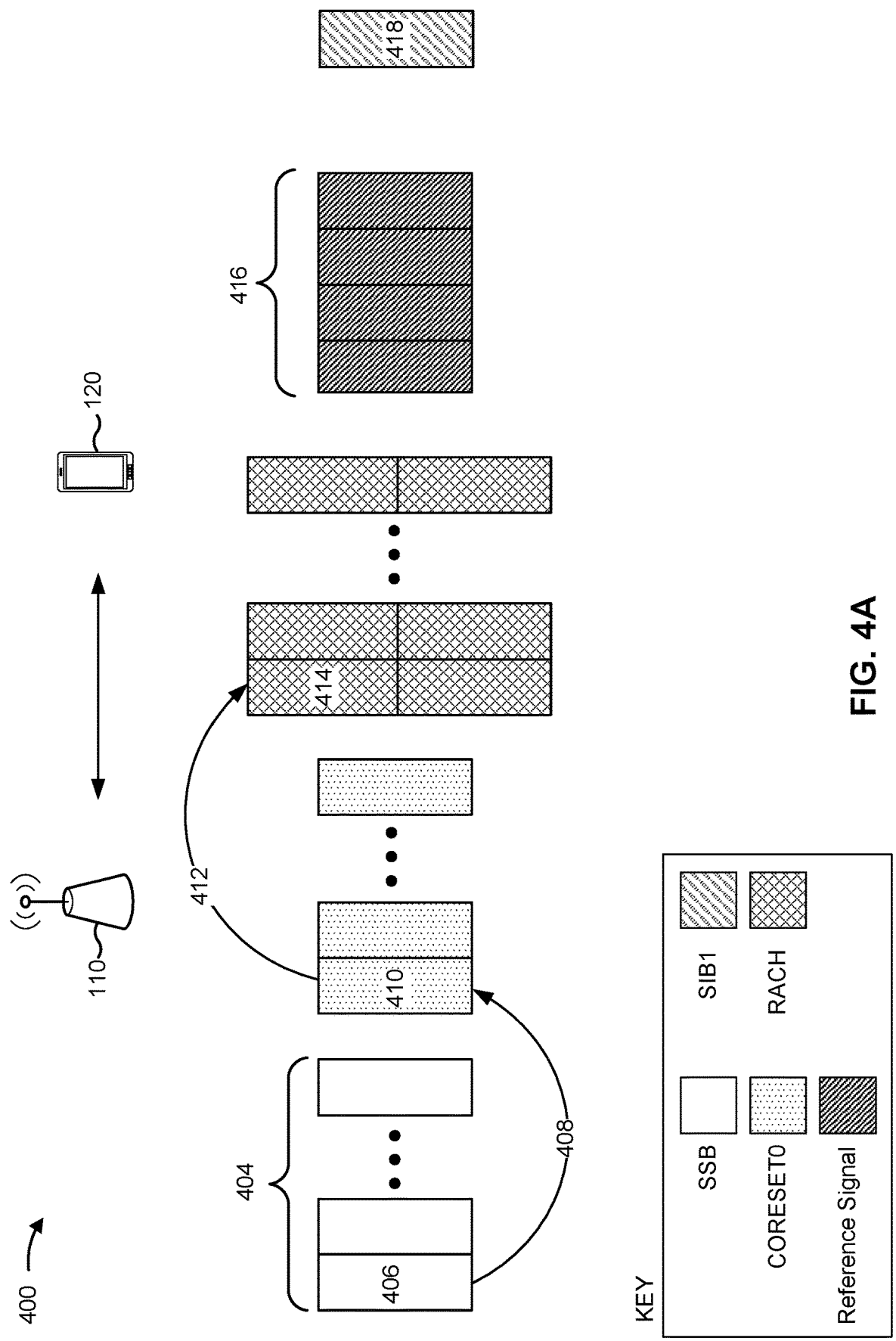
FIGS. 4A and 4B are diagrams illustrating a first example and a second example, respectively, of an access procedure that includes a beam management procedure, in accordance with the present disclosure.
Figure 4B:
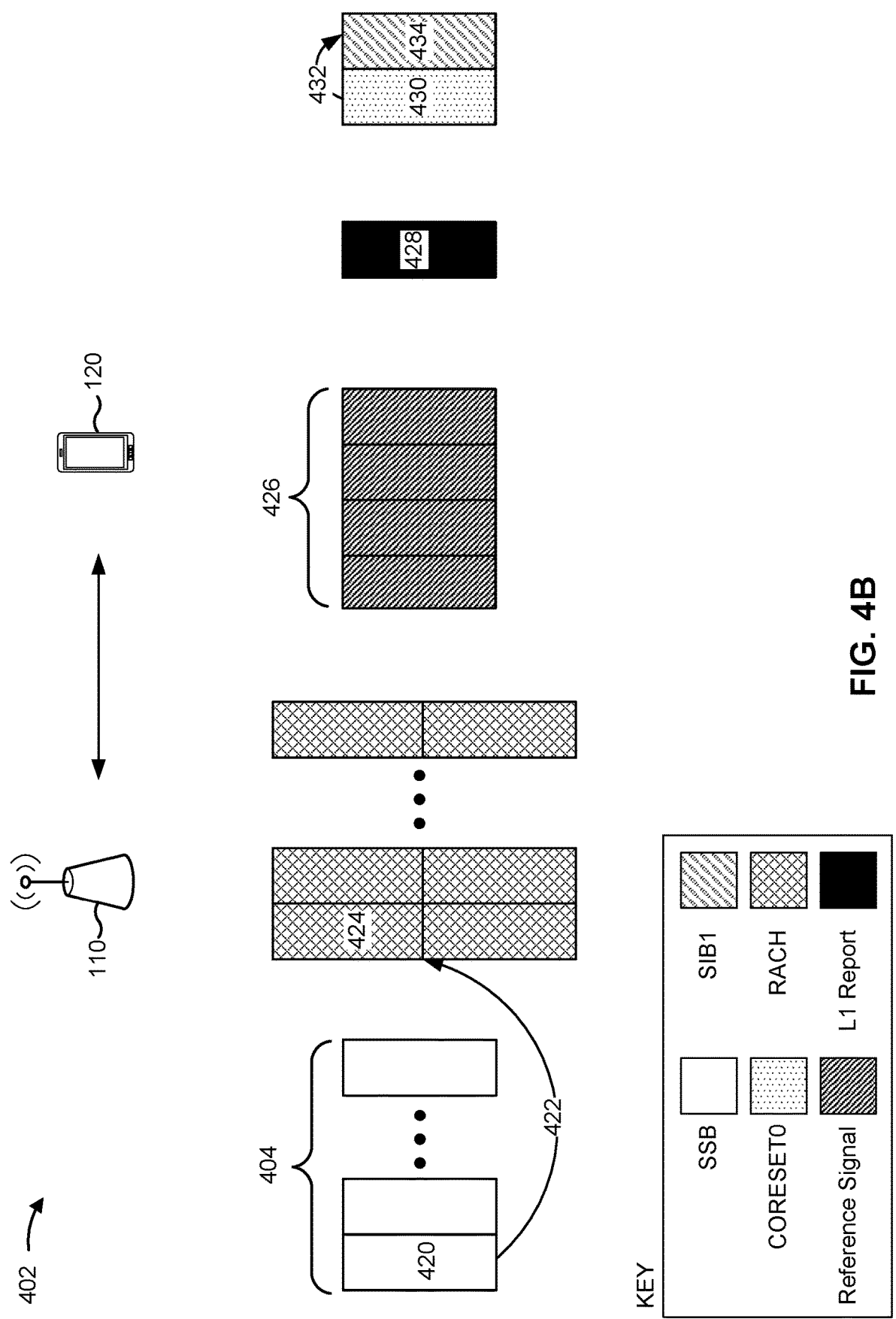

FIGS. 4A and 4B are diagrams illustrating a first example 400 and a second example 402, respectively, of an access procedure that includes a beam management procedure, in accordance with the present disclosure.

The first example 400 shows a first access procedure that performs a beam management procedure before the network node 110 transmits a UE-dedicated SIB1 PDSCH to the UE 120. As shown by reference number 404, a network node 110 may transmit multiple SSBs based at least in part on using multiple beams. As one example, the network node 110 may transmit an SSB on 64 beams using TDM and repeating information on each respective SSB transmission associated with a respective beam as described with regard to FIG. 3. Each beam used for SSB transmission may propagate in a different direction relative to other beams used for SSB transmission. In some aspects, the network node may include, in the SSB, information associated with performing a beam management procedure as described with regard to FIGS. 5 and 6. For instance, the network node may transmit and/or indicate, in the SSB, any combination of a reference signal configuration, a layer 1 (L1) measurement configuration, an L1 measurement reporting configuration, and/or a timing configuration. Alternatively or additionally, the network node may indicate, in the SSB, a CORESET0 configuration (e.g., a frequency resource and/or a time resource associated with a CORESET0).

A UE 120 may receive one or more of the multiple SSB transmissions based at least in part on receiving one or more beams. The UE 120 may select a single beam that has a higher signal quality relative to other beams and recover SSB information from an SSB transmission carried by the beam. For example, the UE 120 may select an SSB 406 (shown as being transmitted using Beam 0) based at least in part on signal quality. In some aspects, and as shown by reference number 408, the UE 120 may recover SSB information that indicates a configuration associated with CORESET0 410.

In some aspects, the network node 110 may transmit, and the UE 120 may receive, one or more downlink transmissions based at least in part on the CORESET0. For instance, the UE 120 may receive a downlink transmission (e.g., PDCCH) based at least in part on using a same beam that was used (and/or selected) by the UE to receive the SSB transmission (e.g., Beam 0). As shown by reference number 412, the network node 110 may transmit RACH occasion information in a downlink transmission that is based at least in part on using the same beam (e.g., Beam 0). In some aspects, the network node may indicate and/or include, in the downlink transmission (e.g., a PDCCH transmission or a PDSCH transmission), information associated with performing a beam management procedure as described with regard to FIGS. 5 and 6, such as any combination of a reference signal configuration, an L1 measurement configuration, an L1 measurement reporting configuration, and/or a timing configuration. As shown by reference number 414, the UE 120 may receive the RACH occasion information and transmit an uplink signal (e.g., a RACH using a PRACH) as shown by reference number 414.

In some aspects, and as shown by reference number 416, the network node 110 may transmit one or more reference signals, such as a channel state information reference signal (CSI-RS) and/or a tracking reference signal (TRS). As one example, the network node 110 may transmit the one or more reference signals based at least in part on a reference signal configuration and/or a timing configuration indicated in an SSB and/or a PDCCH transmission (e.g., using the CORESET0). As part of the beam management procedure, the network node may repeat transmission of a same reference signal using a same beam (e.g., with reference signal repetition being enabled), and the UE 120 may perform, as the beam management procedure, a UE receive beam refinement procedure. For example, the UE 120 may use different receive beam configurations to receive the repeated reference signal. Alternatively or additionally, the UE 120 may receive the reference signal(s) based at least in part on a reference signal configuration and/or a timing configuration indicated in an SSB and/or a PDCCH transmission (e.g., using the CORESET0).

In some aspects, as part of the beam management procedure, the network node may perform a network node transmit beam refinement procedure that includes the network node transmitting one or more reference signals using different transmit beam configurations and/or propagation directions (e.g., with reference signal repetition being disabled, based at least in part on a reference signal configuration, and/or based at least in part on a timing configuration). As part of the network node beam refinement procedure, the UE 120 may use a same receive beam configuration to receive the different receive reference signal transmissions. Alternatively or additionally, the UE 120 may receive the reference signal transmission(s) based at least in part on a reference signal configuration and/or a timing configuration. In some aspects, the UE may generate and transmit, to the network node, a measurement report that is based at least in part on an L1 measurement configuration and/or an L1 measurement reporting configuration (e.g., as described with regard to the second example 402). The UE 120 may perform a time tracking refinement procedure and/or a frequency tracking refinement procedure based at least in part on receiving the reference signal.

The network node 110 may transmit a UE-dedicated SIB1 PDSCH 418 based at least in part on the beam management procedure. For example, the network node 110 may transmit the UE-dedicated SIB1 PDSCH 418 based at least in part on using an updated and/or refined beam as selected and/or calibrated by the beam management procedure. Accordingly, the first example 400 enables the network node 110 and/or UE 120 to improve a signal quality of a beam used for transmission and/or reception of a UE-dedicated SIB1 PDSCH and/or additional communications. The improved signal quality and/or the reduced quantity of air interface resources may reduce recovery errors at a receiver, increase data throughput, and/or reduce data transfer delays.

Referring to FIG. 4B, the second example 402 shows an example access procedure in which a network node 110 and a UE 120 perform a beam management procedure before the network node 110 transmits a UE-dedicated CORESET0 and a UE-dedicated SIB1 PDSCH to the UE 120. As shown by reference number 404, and as described with regard to the first example 400, a network node 110 may transmit multiple SSBs based at least in part on using multiple beams. In some aspects, the network node 110 may indicate, in an SSB 420 and as shown by reference number 422, a RACH occasion configuration. Alternatively or additionally, the network node may indicate and/or include, in the SSB, information associated with performing a beam management procedure as described with regard to FIGS. 5 and 6, such as a reference signal configuration, an L1 measurement configuration, and L1 measurement reporting configuration, and/or a timing configuration. As shown by reference number 424, the UE 120 may transmit a RACH (e.g., using a RACH occasion and/or a PRACH) based at least in part on using a beam associated with an SSB transmission selected by the UE 120.

Based at least in part on receiving the RACH and/or PRACH from the UE 120, the network node 110 may transmit multiple reference signals as shown by reference number 426 as part of a beam management procedure (e.g., a network node transmit beam refinement procedure and/or a UE receive beam refinement procedure). To illustrate, the network node may repeat transmission of a same reference signal using a same beam (e.g., with reference signal repetition being enabled), and the UE 120 may perform, as the beam management procedure, a UE receive beam refinement procedure based at least in part on receiving the reference signals. Alternatively or additionally, as part of a network node beam refinement procedure, the network node may transmit one or more reference signals using different transmit beam configurations (e.g., with reference signal repetition being disabled), and the UE 120 may use a same receive beam configuration to receive the different reference signal transmissions. The network node may transmit, and/or the UE may receive, the reference signal(s) based at least in part on a reference signal configuration and/or a timing configuration.

In some aspects, the UE 120 may generate and transmit an L1 measurement report 428 (e.g., based at least in part on an L1 measurement configuration and/or an L1 measurement reporting configuration). To illustrate, the UE 120 may transmit the L1 measurement report 428 based at least in part on using a reporting occasion as indicated by the L1 measurement reporting configuration. Alternatively or additionally, the UE 120 may generate a particular type of measurement result based at least in part on the L1 measurement configuration. In some aspects, the UE 120 may generate the L1 measurement report based at least in part on receiving the reference signals shown by the reference number 426.

Based at least in part on receiving the L1 measurement report 428, the network node may transmit an indication of a CORESET0 430 (e.g., in an MIB or PDCCH DCI). In some aspects, the network node may transmit the indication of the CORESET0 430 based at least in part on using a refined and/or updated beam selected as part of the beam management procedure.

As shown by reference number 432, the network node 110 may transmit, and the UE may receive, an indication of a UE-dedicated SIB1 PDSCH 434. For example, the network node may transmit PDCCH based at least in part on the CORESET0 430, and indicate in DCI of the PDCCH a configuration of the UE-dedicated SIB1 PDSCH 434. Alternatively or additionally, the network node 110 may transmit a UE-dedicated SIB1 using the UE-dedicated SIB1 PDSCH 434.

Performing a beam management procedure as part of an access procedure, such as a beam refinement procedure that selects a refinement (e.g., a calibration and/or a change in propagation direction) to an existing beam may enable a network node to transmit, and/or a UE to receive, a UE-dedicated SIB1 using a beam with improved signal quality relative to another beam used to transmit an SSB. Alternatively or additionally, the network node and the UE may use the beam with improved signal quality for additional communications. The improved signal quality may reduce recovery errors at a receiver, increase data throughput, and/or reduce data transfer delays.

As indicated above, FIGS. 4A and 4B are provided as examples. Other examples may differ from what is described with regard to FIGS. 4A and 4B.

Figure 5:
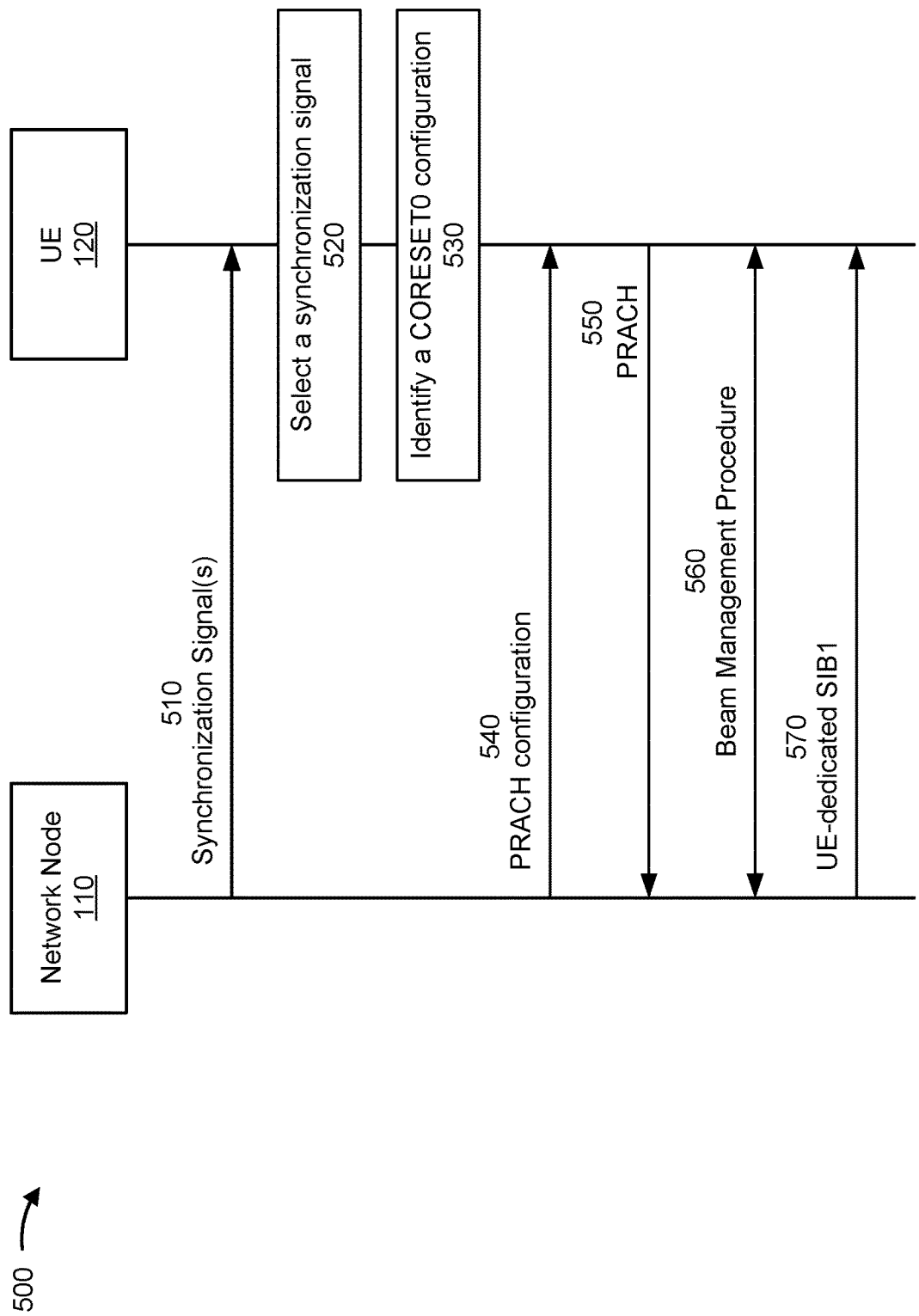
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 may transmit, and a UE 120 may receive, one or more synchronization signals, such as one or more SSBs. In some aspects, the network node 110 may periodically transmit a synchronization signal. Alternatively or additionally, the network node 110 may transmit a same synchronization signal using one or more beams. For instance, the network node 110 may transmit a same SSB on multiple beams, and each beam may be configured to propagate in a different direction relative to the other beams included in the multiple beams.

At times, the network node 110 may include information in the synchronization signal. To illustrate, the network node 110 may indicate, in the synchronization signal, any combination of a reference signal configuration, an L1 measurement configuration, an L1 measurement reporting configuration, and/or a timing configuration.

A reference signal configuration may specify a transmission configuration associated with a reference signal, such as a frequency resource, a time resource, and/or an antenna port resource associated with the reference signal. An L1 measurement configuration may specify one or more measurement parameters, such as a type of measurement to perform and/or a resource type (e.g., periodic, semi persistent, and/or aperiodic) associated with the measurement. An L1 measurement reporting configuration may specify one or more reporting configurations associated with reporting a measurement result, such as a reporting occasion (e.g., an air interface resource to use to transmit a report) and/or information to include in the measurement report. The L1 measurement configuration and/or L1 measurement reporting configuration may be based at least in part on a beam management procedure, such as a network node transmit beam refinement procedure that is associated with the network node calibrating and/or refining a transmit beam and/or a UE receive beam refinement procedure that is associated with the UE 120 calibrating and/or refining a receive beam.

A timing configuration may specify one or more timing delays associated with the access procedure. As one example, the timing configuration may specify a first timing delay between a reference signal transmission (e.g., by the network node 110) and an L1 report transmission (e.g., by the UE 120). Alternatively or additionally, the timing configuration may specify a second timing delay between the reference signal transmission and a CORESET0 transmission (e.g., PDCCH). In some aspects, the timing configuration may specify a third timing delay between the reference signal transmission and a UE-dedicated SIB1 PDSCH transmission, a fourth timing delay between an L1 report transmission and the UE-dedicated SIB1 PDSCH transmission, a fifth timing delay between a CORESET0 transmission and a first reference signal transmission, and/or a sixth timing delay between a PRACH transmission and a first reference signal transmission. While described in the example 500 as configurations indicated by the network node 110, in other examples, a communication standard may specify the timing delays and/or a mapping between a timing delay and a value and/or bit that indicates the timing delay.

In some aspects, the network node 110 may transmit and/or indicate any combination of a reference signal configuration, an L1 measurement configuration, an L1 measurement reporting configuration, and/or a timing configuration based at least in part on a bitfield and/or a value. To illustrate, a communication standard may map a first bit of a reference signal bitfield and/or a first value to a first reference signal configuration and a second bit of the reference signal bitfield and/or a second value to a second reference signal configuration. As another example, the communication standard may map a first bit of a reporting bitfield and/or a third value to a first L1 measurement reporting configuration and a second bit of the reporting bitfield and/or a fourth value to a second L1 measurement reporting configuration. The network node 110 may set a bit in a reference signal bitfield and/or a second bit in a reporting bitfield of an SSB to indicate a particular reference signal configuration and/or a particular L1 measurement reporting configuration. In some aspects, the network node 110 may set a reference signal field to a value that maps to the particular reference signal configuration and/or a reporting field to another value that maps to the particular L1 measurement configuration. Thus, the network node 110 may indicate and/or transmit configuration information based at least in part on a mapping.

As shown by reference number 520, a UE 120 may select a synchronization signal and/or an SSB. For instance, the UE 120 may receive a single beam at a power level that satisfies a power threshold and select the single beam to use for recovering SSB information based at least in part on the single beam satisfying the power threshold. That is, the UE 120 may select the single beam by default based at least in part on only receiving a single beam that satisfies the power threshold. As another example, the UE 120 may receive multiple beams that each satisfy the power threshold, and the UE 120 may select a particular beam with a highest power level out of the multiple beams to use for recovering SSB information (e.g., an MIB and/or MSI). As yet another example, the UE 120 may select a first beam (e.g., first in time) that satisfies the power threshold to reduce an amount of time associated with recovering the SSB information.

As shown by reference number 530, the UE 120 may identify a CORESET0 configuration (e.g., in an MIB). Alternatively or additionally, the UE 120 may identify one or more PDCCH monitoring occasions (e.g., associated with the CORESET0). For instance, the UE 120 may recover SSB information based at least in part on a selected beam, and the recovered SSB information (e.g., the MIB and/or MSI) may indicate a location and/or air interface resources associated with a CORESET0. In some aspects, the UE 120 may identify a PDCCH monitoring occasion that is based at least in part on air interface resources within the CORE-SET0. Alternatively or additionally, the UE 120 may identify an SIB1 PDSCH configuration based at least in part on using the CORESET0 configuration (e.g., in PDCCH that is based at least in part on the CORESET0).

As shown by reference number 540, the network node 110 may transmit, and the UE 120 may receive, a downlink communication (e.g., an MIB or PDCCH) that indicates a PRACH parameter and/or a RACH parameter, such as a PRACH preamble, a time resource associated with a RACH occasion, and/or a frequency resource associated with a RACH occasion. For instance, the network node 110 may transmit, as the downlink communication, PDCCH based at least in part on using the CORESET0. Alternatively or additionally, the network node 110 may indicate, in the downlink communication, any combination of a reference signal configuration, an L1 measurement configuration, an L1 measurement reporting configuration, and/or a timing configuration. The reference signal configuration, the L1 measurement configuration, the L1 measurement reporting configuration, and/or the timing configuration may be based at least in part on a beam management procedure (e.g., a network node transmit beam refinement procedure and/or a UE receive beam refinement procedure).

As shown by reference number 550, the UE 120 may transmit, and the network node 110 may receive, a PRACH transmission. For instance, the UE 120 may transmit a RACH at a RACH occasion specified by the downlink communication and based at least in part on using the PRACH. Alternatively or additionally, and as shown by the example 500, the network node 110 may receive the RACH transmission and/or the PRACH transmission from the UE prior to transmitting a UE-dedicated SIB1 that is associated with the UE 120 (shown by reference number 570).

As shown by reference number 560, the network node 110 and the UE 120 may perform a beam management procedure. To illustrate, the network node 110 may transmit a reference signal (e.g., a CSI-RS and/or a TRS) that is based at least in part on the beam management procedure. In some aspects, the network node 110 may transmit multiple reference signals (e.g., different reference signals or a same reference signal repeatedly). As one example, the network node 110 may transmit one or more reference signals based at least in part on a transmission configuration specified by reference signal configuration. Alternatively or additionally the network node 110 may transmit, and the UE 120 may receive, a reference signal based at least in part on a derived transmission configuration. For instance, the network node 110 and/or the UE 120 may identify a first transmission configuration and/or air interface resource associated with a CORESET0, an SSB, and/or a RACH, such as a bandwidth and/or a bandwidth part, and derive a second transmission configuration for the reference signal (e.g., a same bandwidth part and/or a same bandwidth part).

The network node 110 and the UE 120 may perform any combination of beam management procedures, such as a UE receive beam refinement procedure and/or a network node transmit beam refinement procedure. In some aspects, the network node 110 may transmit one or more reference signals based at least in part on a type of beam management procedure, such as by transmitting a same reference signal repeatedly on a same beam based at least in part on reference signal repetition being enabled (e.g., for a UE receive beam refinement procedure) or by transmitting a reference signal on different beams based at least in part on reference signal repetition being disabled for a network node transmit beam refinement procedure. In some aspects, the network node 110 may transmit a TRS using a transmission configuration that is based at least in part on the UE 120 performing a time tracking refinement procedure and/or a frequency tracking refinement procedure, such as by using a particular carrier frequency and/or transmission periodicity.

As part of the beam management procedure, the UE 120 may generate an L1 measurement report. In some aspects, the UE 120 may generate the L1 measurement report based at least in part on an L1 measurement reporting configuration (e.g., indicated in an SSB and/or indicated in a PDCCH that uses a CORESET0) and one or more reference signals. Alternatively or additionally, the UE 120 may transmit the L1 measurement report to the network node 110 (e.g., prior to receiving the UE-dedicated SIB1). As one example, the UE 120 may select a communication beam (e.g., for communication with the network node 110) based at least in part on the beam measurement procedure, such as a transmit communication beam for transmissions from the network node 110. That is, the UE 120 may select the (transmit) communication beam as a beam with a higher (received) signal quality relative to other beams evaluated as part of a network node beam refinement procedure. In some aspects, and as part of the beam management procedure, the UE 120 may indicate selection of the communication beam to the network node 110. The network node 110 may transmit an acknowledgement of the selected communication beam and/or an instruction to use the selected communication beam, but in other examples, the UE 120 may autonomously use the selected communication beam to receive and/or transmit one or more other communications with the network node 110. That is, the UE 120 may use the selected communication beam for additional communications with the network node 110 and without receiving an acknowledgement and/or an instruction to use the selected communication beam.

As shown by reference number 570, the network node 110 may transmit, and the UE 120 may receive, an indication of a UE-specific SIB1 PDSCH (e.g., that is based at least in part on an SIB1 PDSCH configuration transmitted as described with regard to reference number 530). For example, the network node may transmit PDCCH based at least in part on using the CORESET0, and indicate the UE-specific SIB1 PDSCH in DCI of the PDCCH. In some aspects, the network node 110 may transmit the indication based at least in part on the communication beam indicated by the UE 120. Alternatively or additionally, the UE 120 may receive the indication of the UE-specific SIB1 PDSCH using the communication beam, either based at least in part on receiving an instruction and/or acknowledgement from the network node 110 to use the communication beam, or autonomously without receiving the instruction or acknowledgement from the network node 110.

Performing a beam management procedure as part of an access procedure, such as a beam refinement procedure, may enable a network node to transmit, and/or a UE to receive, a UE-dedicated SIB1 using a beam with improved signal quality relative to another beam used to transmit an SSB. The network node and/or the UE may alternatively or additional use the beam for additional communications. The improved signal quality may reduce recovery errors at a receiver, increase data throughput, and/or reduce data transfer delays.

As indicated above, FIG. 5 is provided as an example. Other examples may differ from what is described with regard to FIG. 5.

Figure 6:
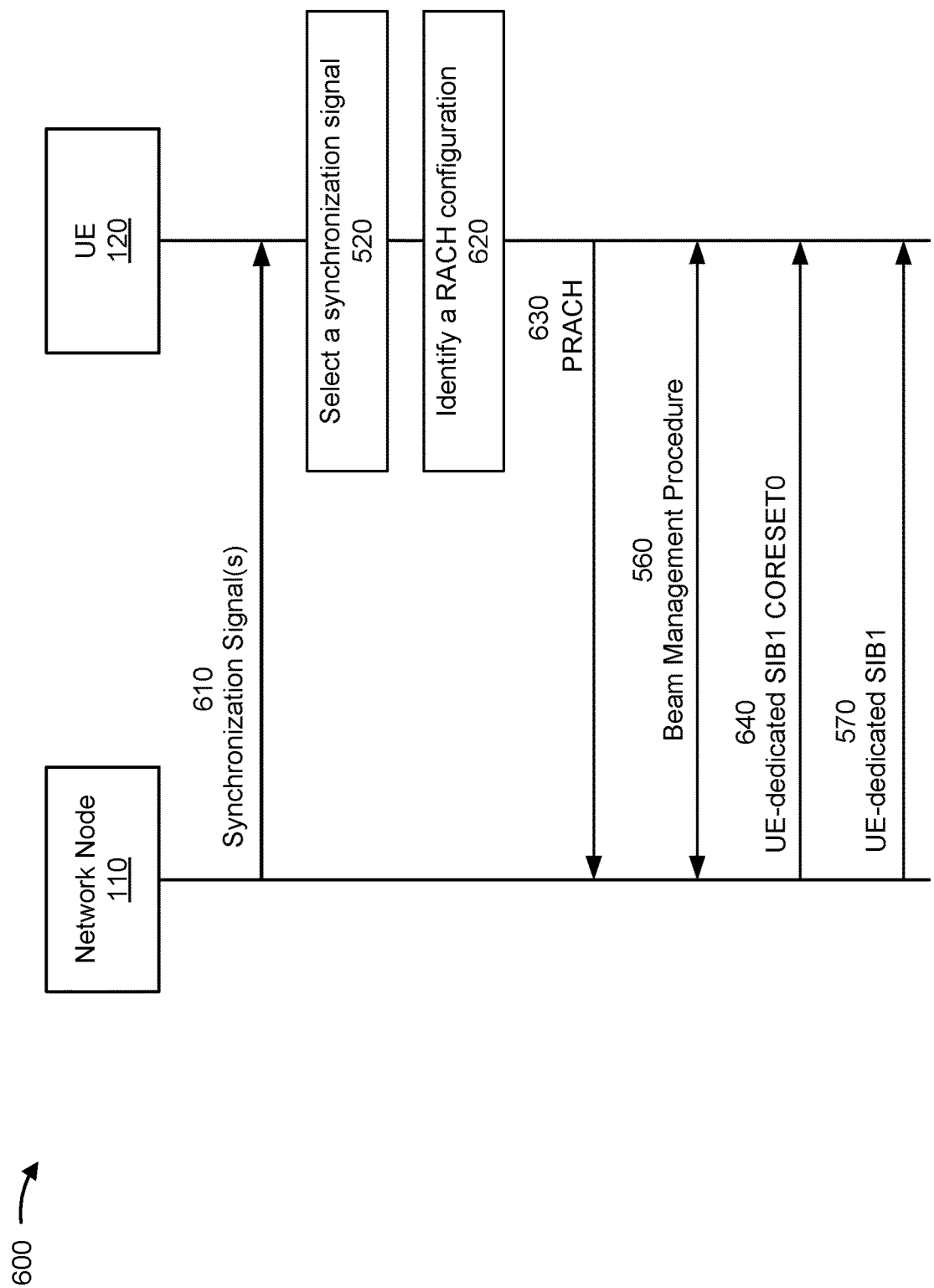
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure.

As shown by reference number 610, a network node 110 may transmit, and a UE 120 may receive, one or more synchronization signals, such as an SSB. In some aspects, the network node 110 may periodically transmit the synchronization signal. Alternatively or additionally, the network node 110 may transmit a same synchronization signal using one or more beams. At times, the network node 110 may include information in the synchronization signal and/or SSB. As one example, the network node 110 may transmit and/or indicate, in the SSB, any combination of a reference signal configuration, an L1 measurement configuration, an L1 measurement reporting configuration, and/or a timing configuration as described above. In some aspects, the synchronization signal and/or SSB may indicate a PRACH configuration and/or a RACH configuration (e.g., a PRACH preamble and/or a RACH occasion).

As shown by reference number 520, and as described with regard to FIG. 5, the UE 120 may select a synchronization signal and/or an SSB. Alternatively or additionally, as shown by reference number 620, the UE 120 may identify a PRACH parameter and/or RACH parameter based at least in part on the selected synchronization signal and/or selected SSB. For example, the UE 120 may recover information transmitted in an MIB associated with the selected SSB, and the MIB may indicate the PRACH parameter and/or RACH parameter. However, other fields of the SSB may alternatively or additionally indicate a PRACH parameter and/or a RACH parameter.

As shown by reference number 630, the UE 120 may transmit, and the network node 110 may receive, a PRACH transmission (e.g., a RACH that is transmitted based at least in part on a PRACH). As one example, the UE 120 may transmit the PRACH transmission as described with regard to reference number 550 of FIG. 5. In some aspects, and as shown by the example 600, the network node 110 may receive the PRACH transmission and/or the RACH transmission prior to transmitting a UE-dedicated SIB1 associated with the UE 120

As shown by reference number 560, and as described with regard to FIG. 5, the network node 110 and the UE 120 may perform a beam management procedure. To illustrate, the network node 110 may transmit a reference signal (e.g., a CSI-RS and/or a TRS) that is based at least in part on the beam management procedure, such as by transmitting multiple, different reference signals and/or a same reference signal repeatedly using a same beam and/or multiple, different beams. The network node 110 may transmit a reference signal based at least in part on a transmission configuration specified by a reference signal configuration (e.g., indicated in an SSB and/or an MIB of the SSB). Alternatively or additionally the network node 110 may transmit, and the UE 120 may receive, a reference signal based at least in part on a derived transmission configuration.

The network node 110 and the UE 120 may perform any combination of beam management procedures, such as a UE receive beam refinement procedure and/or a network node transmit beam refinement procedure. In some aspects, the network node 110 may transmit a TRS using a transmission configuration that is based at least in part on the UE 120 performing a time tracking refinement procedure and/or a frequency tracking refinement procedure, such as by using a particular carrier frequency and/or transmission periodicity.

The UE 120 may generate an L1 measurement report (e.g., based at least in part on an L1 measurement configuration and/or an L1 measurement reporting configuration indicated in an SSB) and one or more reference signals. The UE 120 may transmit the L1 measurement report to the network node 110 (e.g., prior to receiving an indication of a UE-dedicated CORESET0 and/or a UE-dedicated SIB1). The UE 120 may select a communication beam (e.g., for communication with the network node 110) based at least in part on the beam measurement procedure, such as by selecting a beam with a higher signal quality relative to other beams evaluated as part of the beam management procedure. The UE 120 may indicate selection of the communication beam to the network node 110, and the network node 110 may transmit an acknowledgement of the communication beam. In other examples, the UE 120 may autonomously use the communication beam to receive and/or transmit one or more other communications with the network node 110.

As shown by reference number 640, the network node 110 may transmit, and the UE 120 may receive, an indication of a UE-specific CORESET0. To illustrate, the network node 110 may transmit an indication of a CORESET0 configuration that is specific to the UE 120. In some aspects, the network node 110 may transmit the indication of the UE-specific CORESET0 based at least in part on a communication beam selected by the UE 120. Alternatively or additionally, the network node may transmit a second communication (e.g., a PDCCH) that is based at least in part on using the UE-dedicated CORESET0. As described above, the UE 120 may receive the indication of the UE-specific CORESET0 and/or the second communication based at least in part on the (selected) communication beam and without receiving an instruction and/or acknowledgement from the network node 110 that specifies to use the communication beam.

As described with regard to FIG. 5, and as shown by reference number 570, the network node 110 may transmit, and the UE 120 may receive, an indication of a UE-specific SIB1 PDSCH. As one example, the network node 110 may transmit an instruction that specifies to use the communication beam to receive the UE-dedicated SIB1 PDSCH, and the UE 120 may receive the UE-dedicated SIB1 PDSCH based at least in part on using the communication beam. Alternatively or additionally, the UE 120 may autonomously receive the UE-dedicated SIB1 PDSCH without receiving the instruction from the network node 110. In some aspects, the UE 120 may receive the UE-dedicated SIB1 PDSCH based at least in part on using the UE-dedicated CORESET0.

Performing a beam management procedure as part of an access procedure, such as a beam refinement procedure, may enable a network node to transmit, and/or a UE to receive, a UE-dedicated SIB1 using a beam with improved signal quality relative to another beam used to transmit an SSB. The network node and/or the UE may alternatively or additional use the beam for additional communications. The improved signal quality may reduce recovery errors at a receiver, increase data throughput, and/or reduce data transfer delays.

As indicated above, FIG. 6 is provided as an example. Other examples may differ from what is described with regard to FIG. 6.

Figure 7:
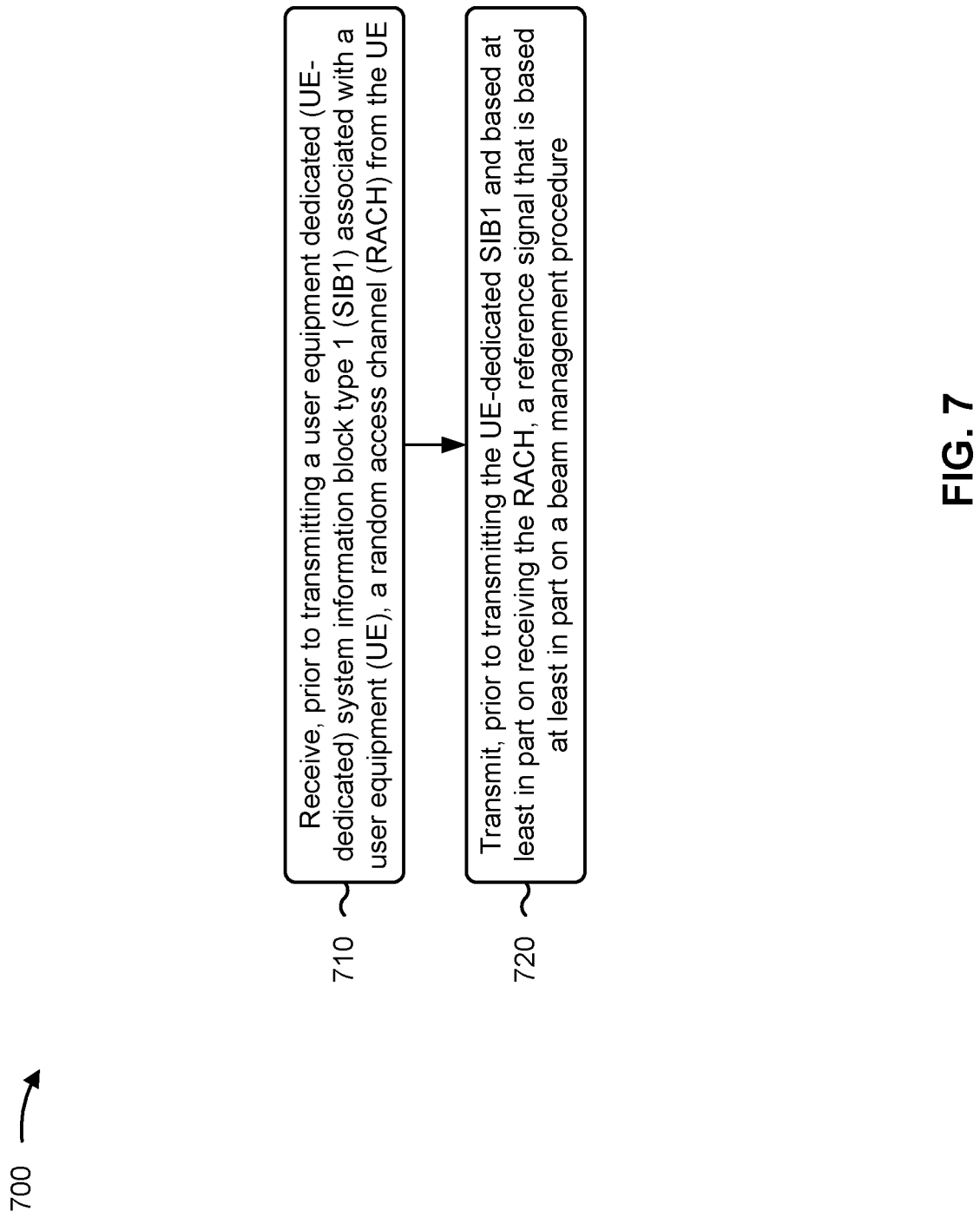
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with beam refinement for UE-dedicated access information.

As shown in FIG. 7, in some aspects, process 700 may include receiving, prior to transmitting a UE-dedicated SIB1 associated with UE, a RACH from the UE (block 710). For example, the network node (e.g., using communication manager 150 and/or reception component 902, depicted in FIG. 9) may receive, prior to transmitting a UE-dedicated SIB1 associated with UE, a RACH from the UE, as described above.

As further shown in FIG. 7, in some aspects, process 700 may include transmitting, prior to transmitting the UE-dedicated SIB1 and based at least in part on receiving the RACH, a reference signal that is based at least in part on a beam management procedure (block 720). For example, the network node (e.g., using communication manager 150 and/or transmission component 904, depicted in FIG. 9) may transmit, prior to transmitting the UE-dedicated SIB1 and based at least in part on receiving the RACH, a reference signal that is based at least in part on a beam management procedure, as described above.

Process 700 may include additional aspects, such as any single aspect or any combination of aspects described below and/or in connection with one or more other processes described elsewhere herein.

In a first aspect, transmitting the reference signal includes transmitting the reference signal prior to transmitting a UE-dedicated CORESET0.

In a second aspect, transmitting the reference signal includes transmitting the reference signal based at least in part on a beam used to receive the RACH.

In a third aspect, process 700 includes transmitting a reference signal configuration indication that specifies a transmission configuration associated with the reference signal, an transmitting the reference signal includes transmitting the reference signal based at least in part on the transmission configuration.

In a fourth aspect, transmitting the reference signal configuration indication includes transmitting the reference signal configuration indication in an SSB.

In a fifth aspect, transmitting the reference signal configuration indication includes transmitting the reference signal configuration indication in a CORESET0.

In a sixth aspect, process 700 includes transmitting an L1 measurement reporting configuration associated with measuring the reference signal.

In a seventh aspect, transmitting the L1 measurement reporting configuration includes transmitting the L1 measurement reporting configuration in at least one of an SSB, or a CORESET0.

In an eighth aspect, the beam management procedure includes a network node beam refinement procedure, and the L1 measurement reporting configuration is based at least in part on the network node beam refinement procedure.

In a ninth aspect, transmitting the reference signal includes transmitting the reference signal based at least in part on using a transmission configuration that is associated with a CORESET0, an SSB, or the RACH.

In a tenth aspect, the transmission configuration includes at least one of a bandwidth, or a bandwidth part.

In an eleventh aspect, the beam management procedure includes a UE receive beam refinement procedure, and transmitting the reference signal includes transmitting, as part of the UE receive beam refinement procedure, the reference signal based at least in part on reference signal repetition being enabled.

In a twelfth aspect, transmitting the reference signal includes transmitting the reference signal based at least in part on reference signal repetition being disabled.

In a thirteenth aspect, the reference signal includes a tracking reference signal with a transmission configuration that is based at least in part on at least one of a time tracking refinement by the UE, or a frequency tracking refinement by the UE.

In a fourteenth aspect, process 700 includes transmitting a timing configuration indication that specifies a timing delay between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

In a fifteenth aspect, process 700 includes communicating with the UE based at least in part on a timing delay that is specified at least in part by a communication standard, the timing delay being between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
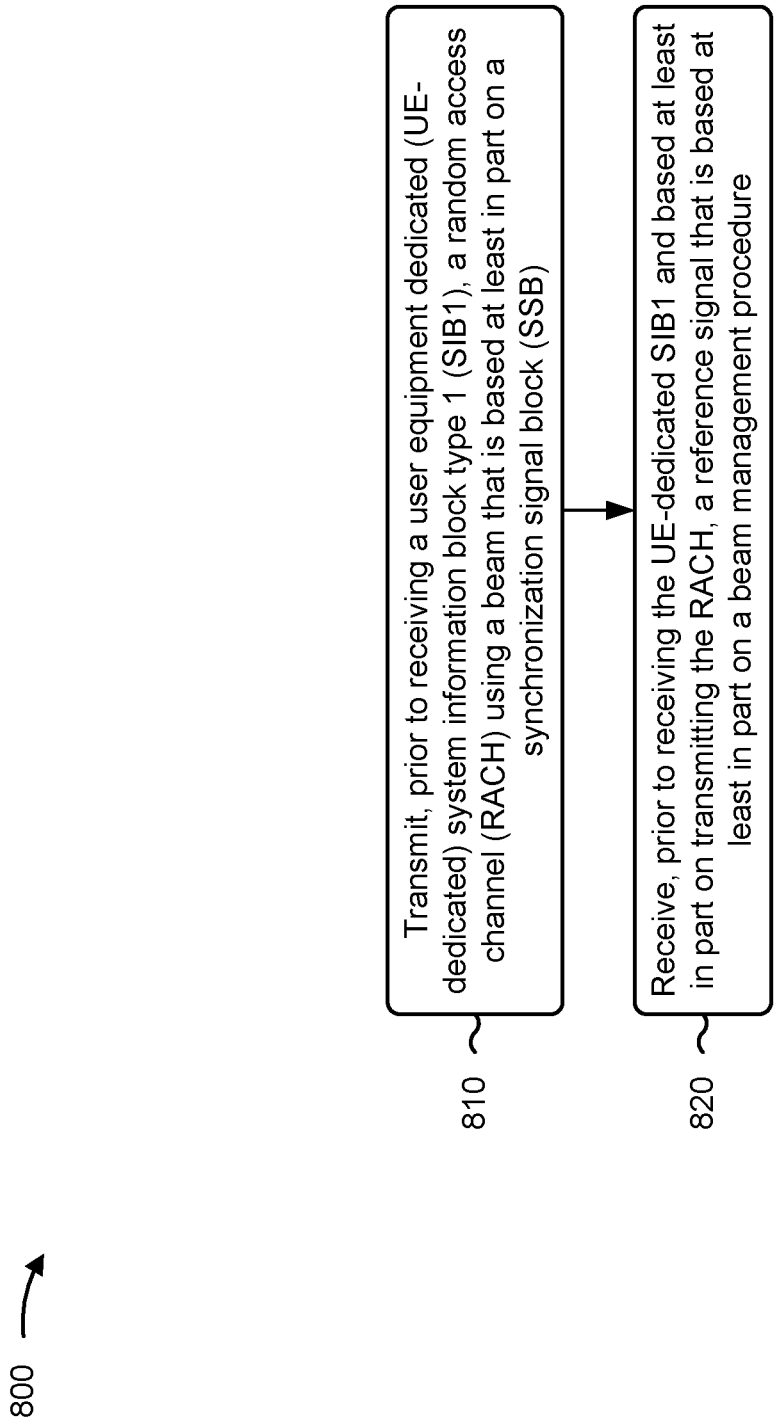
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with beam refinement for UE-dedicated access information.

As shown in FIG. 8, in some aspects, process 800 may include transmitting, prior to receiving a UE-dedicated SIB1, a RACH using a beam that is based at least in part on an SSB (block 810). For example, the UE (e.g., using communication manager 140 and/or transmission component 1004, depicted in FIG. 10) may transmit, prior to receiving a UE-dedicated SIB1, a RACH using a beam that is based at least in part on an SSB, as described above.

As further shown in FIG. 8, in some aspects, process 800 may include receiving, prior to receiving the UE-dedicated SIB1 and based at least in part on transmitting the RACH, a reference signal that is based at least in part on a beam management procedure (block 820). For example, the UE (e.g., using communication manager 140 and/or reception component 1002, depicted in FIG. 10) may receive, prior to receiving the UE-dedicated SIB1 and based at least in part on transmitting the RACH, a reference signal that is based at least in part on a beam management procedure, as described above.

Process 800 may include additional aspects, such as any single aspect or any combination of aspects described below and/or in connection with one or more other processes described elsewhere herein.

In a first aspect, receiving the reference signal includes receiving the reference signal prior to receiving a UE-dedicated CORESET0.

In a second aspect, receiving the reference signal includes receiving the reference signal based at least in part on a beam used to receive the RACH.

In a third aspect, process 800 includes receiving a reference signal configuration indication that specifies a transmission configuration associated with the reference signal, and receiving the reference signal includes receiving the reference signal based at least in part on the transmission configuration.

In a fourth aspect, receiving the reference signal configuration indication includes receiving the reference signal configuration indication in the SSB.

In a fifth aspect, receiving the reference signal configuration indication includes receiving the reference signal configuration indication in a CORESET0.

In a sixth aspect, process 800 includes receiving an L1 measurement reporting configuration associated with measuring the reference signal.

In a seventh aspect, receiving the L1 measurement reporting configuration includes receiving the L1 measurement reporting configuration in at least one of the SSB, or a CORESET0.

In an eighth aspect, the beam management procedure includes a network node beam refinement procedure, and the L1 measurement reporting configuration is based at least in part on the network node beam refinement procedure.

In a ninth aspect, process 800 includes generating an L1 measurement report based at least in part on the L1 measurement reporting configuration and the reference signal, and transmitting, prior to receiving the UE-dedicated SIB1, the L1 measurement report.

In a tenth aspect, receiving the reference signal includes receiving the reference signal based at least in part on using a transmission configuration that is associated with a CORESET0 configuration, an SSB configuration associated with the SSB, or a RACH configuration associated with the RACH.

In an eleventh aspect, the transmission configuration includes at least one of a bandwidth, or a bandwidth part.

In a twelfth aspect, the beam management procedure includes a UE receive beam refinement procedure, and receiving the reference signal includes receiving, as part of the UE receive beam refinement procedure, the reference signal based at least in part on reference signal repetition being enabled.

In a thirteenth aspect, receiving the reference signal includes receiving the reference signal based at least in part on reference signal repetition being disabled.

In a fourteenth aspect, the reference signal includes a tracking reference signal with a transmission configuration that is based at least in part on at least one of a time tracking refinement by the UE, or a frequency tracking refinement by the UE.

In a fifteenth aspect, process 800 includes receiving a timing configuration indication that specifies a timing delay between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

In a sixteenth aspect, process 800 includes communicating with a network node based at least in part on a timing delay that is specified at least in part by a communication standard, the timing delay being between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

In a seventeenth aspect, the beam management procedure includes a network node beam refinement procedure, reference signal repetition associated with the reference signal is disabled, and process 800 includes selecting, prior to receiving the UE-dedicated SIB1, a communication beam based at least in part on the network node beam refinement procedure, indicating, prior to receiving the UE-dedicated SIB1, the communication beam to the network node, and receiving, using the communication beam, a communication based at least in part on a UE-dedicated SIB1 PDSCH.

In an eighteenth aspect, the communication is a first communication, and process 800 includes receiving, using the communication beam, a second communication based at least in part on a UE-dedicated CORESET0.

In a nineteenth aspect, receiving the communication using the communication beam includes using the communication beam to receive the communication without receiving an instruction from a network node that specifies to use the communication beam.

In a twentieth aspect, process 800 includes receiving an instruction from a network node that specifies to use the communication beam to receive the UE-dedicated SIB1 PDSCH, and receiving the communication using the communication beam is based at least in part on receiving the instruction from the network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
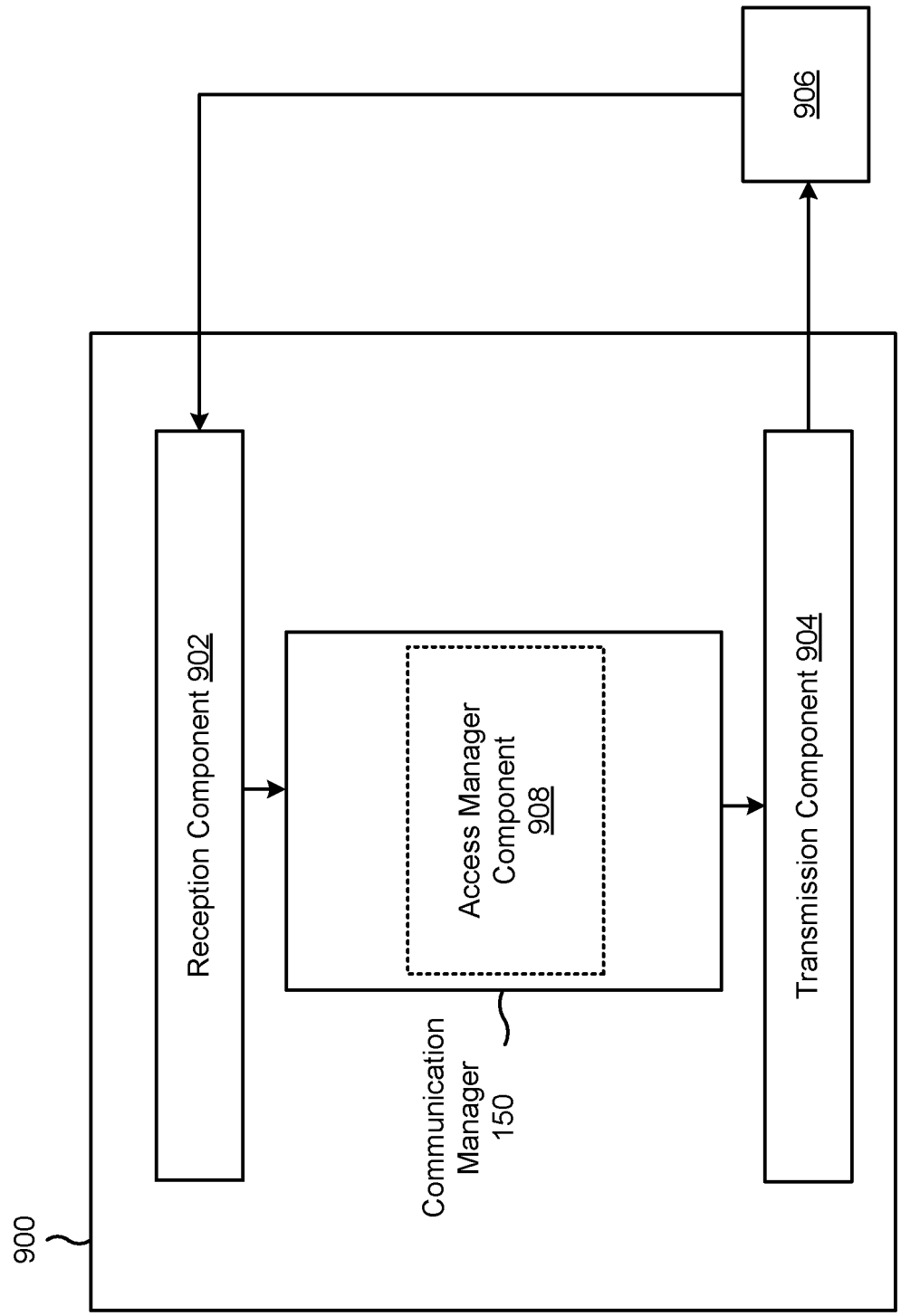
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an access manager component 908, among other examples.

In some aspects, the apparatus 900 may be configured to perform one or more operations described herein in connection with FIGS. 3-8. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The access manager component 908 may receive, by way of the reception component 902 and prior to transmitting a UE-dedicated SIB1 associated with UE, a RACH from the UE. The transmission component 904 may transmit, prior to transmitting the UE-dedicated SIB1 and based at least in part on receiving the RACH, a reference signal that is based at least in part on a beam management procedure.

The access manager component 908 may transmit, by way of the transmission component 904, a reference signal configuration indication that specifies a transmission configuration associated with the reference signal. Alternatively or additionally, the access manager component 908 may transmit, by way of the transmission component 904, an L1 measurement reporting configuration associated with measuring the reference signal. In some aspects, access manager component 908 may transmit, by way of the transmission component 904, a timing configuration indication that specifies a timing delay between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

The access manager component 908 may communicate with the UE based at least in part on a timing delay that is specified at least in part by a communication standard, the timing delay being between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
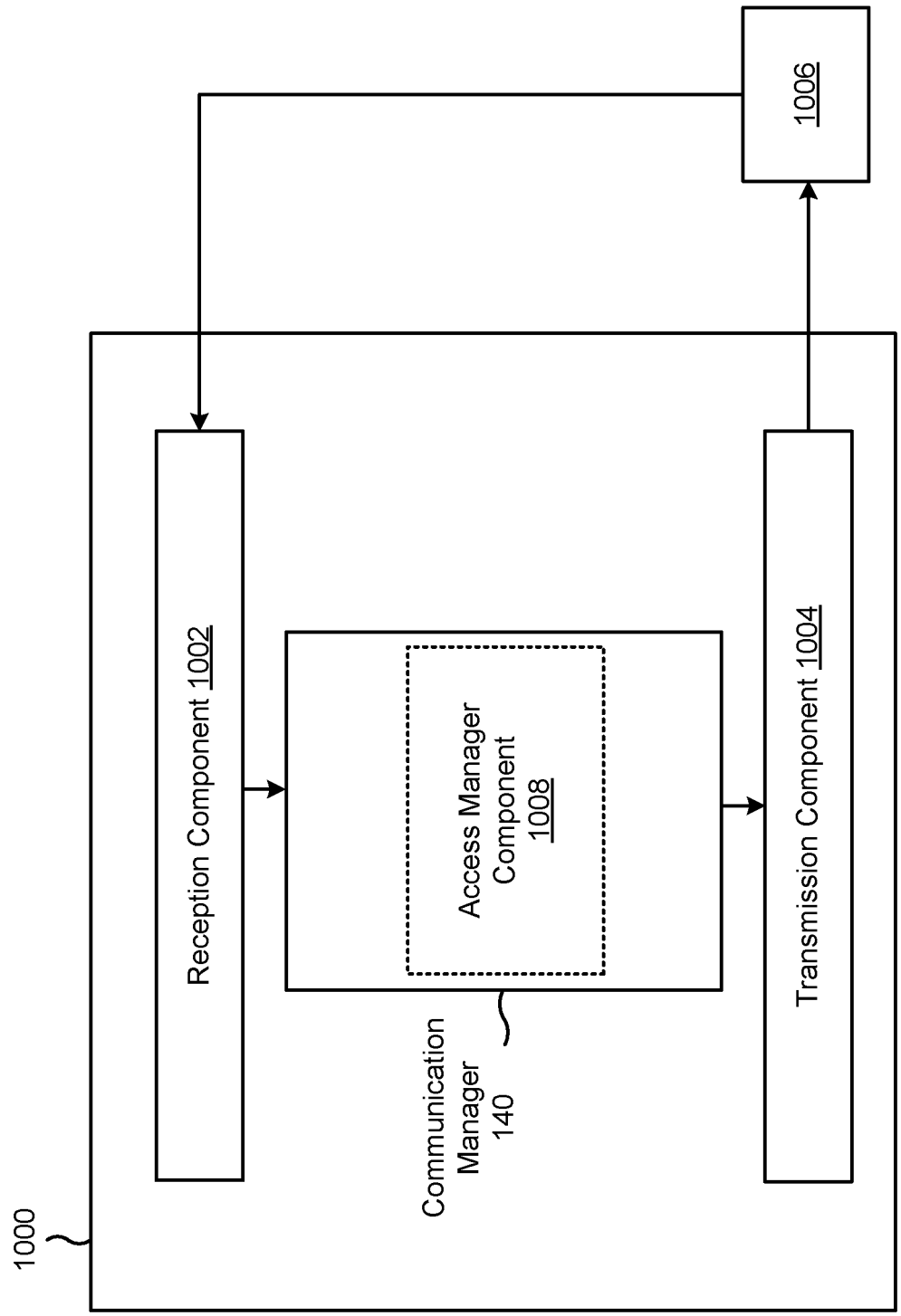
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an access manager component 1008, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The access manager component 1008 may transmit, by way of the transmission component 1004 and prior to receiving a UE-dedicated SIB1, a RACH using a beam that is based at least in part on an SSB. The reception component 1002 may receive, prior to receiving the UE-dedicated SIB1 and based at least in part on transmitting the RACH, a reference signal that is based at least in part on a beam management procedure.

The access manager component 1008 may receive, by way of the reception component 1002, a reference signal configuration indication that specifies a transmission configuration associated with the reference signal. Alternatively or additionally, the access manager component 1008 may receive, by way of the reception component 1002, an L1 measurement reporting configuration associated with measuring the reference signal.

The access manager component 1008 may generate an L1 measurement report based at least in part on the L1 measurement reporting configuration and the reference signal. In some aspects, the access manager component 1008 may transmit, by way of the transmission component 1004 and prior to receiving the UE-dedicated SIB1, the L1 measurement report.

The access manager component 1008 may receive, by way of the reception component 1002, a timing configuration indication that specifies a timing delay between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

The access manager component 1008 may communicate with a network node based at least in part on a timing delay that is specified at least in part by a communication standard, the timing delay being between at least one of a reference signal transmission and an L1 report transmission, the reference signal transmission and a CORESET0, the reference signal transmission and a UE-dedicated SIB1 PDSCH, the L1 report transmission and the CORESET0, the L1 report transmission and the UE-dedicated SIB1 PDSCH, the CORESET0 and the reference signal transmission, or a physical random access channel and the reference signal transmission.

The access manager component 1008 may receive, by way of the reception component 1002, an instruction from a network node that specifies to use the communication beam to receive the UE-dedicated SIB1 PDSCH. In some aspects, the reception component 1002 may receive a communication using the communication beam and based at least in part on receiving the instruction from the network node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a network node, comprising: receiving, prior to transmitting a user equipment dedicated (UE-dedicated) system information block type 1 (SIB1) associated with a user equipment (UE), a random access channel (RACH) from the UE; and transmitting, prior to transmitting the UE-dedicated SIB1 and based at least in part on receiving the RACH, a reference signal that is based at least in part on a beam management procedure.

Aspect 2: The method of Aspect 1, wherein transmitting the reference signal comprises: transmitting the reference signal prior to transmitting a UE-dedicated control resource set zero (CORESET0).

Aspect 3: The method of Aspect 1 or Aspect 2, wherein transmitting the reference signal comprises: transmitting the reference signal based at least in part on a beam used to receive the RACH.

Aspect 4: The method of any one of Aspects 1-3, further comprising: transmitting a reference signal configuration indication that specifies a transmission configuration associated with the reference signal, wherein transmitting the reference signal comprises: transmitting the reference signal based at least in part on the transmission configuration, wherein transmitting the reference signal comprises: transmitting the reference signal based at least in part on the transmission configuration.

Aspect 5: The method of Aspect 4, wherein transmitting the reference signal configuration indication comprises: transmitting the reference signal configuration indication in a synchronization system block (SSB).

Aspect 6: The method of Aspect 4, wherein transmitting the reference signal configuration indication comprises: transmitting the reference signal configuration indication in a control resource set zero (CORESET0).

Aspect 7: The method of any one of Aspects 1-6, further comprising: transmitting a Layer 1 measurement reporting configuration associated with measuring the reference signal.

Aspect 8: The method of Aspect 7, wherein transmitting the Layer 1 measurement reporting configuration comprises: transmitting the Layer 1 measurement reporting configuration in at least one of: a synchronization system block (SSB), or a control resource set zero (CORESET0).

Aspect 9: The method of Aspect 7 or Aspect 8, wherein the beam management procedure comprises a network node beam refinement procedure, and wherein the Layer 1 measurement reporting configuration is based at least in part on the network node beam refinement procedure.

Aspect 10: The method of any one of Aspects 1-9, wherein transmitting the reference signal comprises: transmitting the reference signal based at least in part on using a transmission configuration that is associated with: a control resource set zero (CORESET0), a synchronization system block (SSB), or the RACH.

Aspect 11: The method of Aspect 10, wherein the transmission configuration comprises at least one of: a bandwidth, or a bandwidth part.

Aspect 12: The method of any one of Aspects 1-11, wherein the beam management procedure comprises a UE receive beam refinement procedure, and wherein transmitting the reference signal comprises: transmitting, as part of the UE receive beam refinement procedure, the reference signal based at least in part on reference signal repetition being enabled.

Aspect 13: The method of any one of Aspects 1-12, wherein transmitting the reference signal comprises: transmitting the reference signal based at least in part on reference signal repetition being disabled.

Aspect 14: The method of any one of Aspects 1-13, wherein the reference signal comprises a tracking reference signal with a transmission configuration that is based at least in part on at least one of: a time tracking refinement by the UE, or a frequency tracking refinement by the UE.

Aspect 15: The method of any one of Aspects 1-14, further comprising: transmitting a timing configuration indication that specifies a timing delay between at least one of: a reference signal transmission and a Layer 1 report transmission, the reference signal transmission and a control resource set zero (CORESET0), the reference signal transmission and a UE-dedicated SIB1 physical downlink shared channel (PDSCH), the Layer 1 report transmission and the CORESET0, the Layer 1 report transmission and the UE-dedicated SIB1 PDSCH, the CORESET0 and the reference signal transmission, or a physical random access channel and the reference signal transmission.

Aspect 16: The method of any one of Aspects 1-15, further comprising: communicating with the UE based at least in part on a timing delay that is specified at least in part by a communication standard, the timing delay being between at least one of: a reference signal transmission and a Layer 1 report transmission, the reference signal transmission and a control resource set zero (CORESET0), the reference signal transmission and a UE-dedicated SIB1 physical downlink shared channel (PDSCH), the Layer 1 report transmission and the CORESET0, the Layer 1 report transmission and the UE-dedicated SIB1 PDSCH, the CORESET0 and the reference signal transmission, or a physical random access channel and the reference signal transmission.

Aspect 17: A method of wireless communication performed by an apparatus of a user equipment (UE), comprising: transmitting, prior to receiving a user equipment dedicated (UE-dedicated) system information block type 1 (SIB1), a random access channel (RACH) using a beam that is based at least in part on a synchronization signal block (SSB); and receiving, prior to receiving the UE-dedicated SIB1 and based at least in part on transmitting the RACH, a reference signal that is based at least in part on a beam management procedure.

Aspect 18: The method of Aspect 17, wherein receiving the reference signal comprises: receiving the reference signal prior to receiving a UE-dedicated control resource set zero (CORESET0).

Aspect 19: The method of Aspect 17 or Aspect 18, wherein receiving the reference signal comprises: receiving the reference signal based at least in part on a beam used to receive the RACH.

Aspect 20: The method of any one of Aspects 17-19, further comprising: receiving a reference signal configuration indication that specifies a transmission configuration associated with the reference signal, wherein receiving the reference signal comprises: receiving the reference signal based at least in part on the transmission configuration, wherein receiving the reference signal comprises: receiving the reference signal based at least in part on the transmission configuration.

Aspect 21: The method of Aspect 20, wherein receiving the reference signal configuration indication comprises: receiving the reference signal configuration indication in the SSB.

Aspect 22: The method of Aspect 20 or Aspect 21, wherein receiving the reference signal configuration indication comprises: receiving the reference signal configuration indication in a control resource set zero (CORESET0).

Aspect 23: The method of any one of Aspects 17-22, further comprising: receiving a Layer 1 measurement reporting configuration associated with measuring the reference signal.

Aspect 24: The method of Aspect 23, wherein receiving the Layer 1 measurement reporting configuration comprises: receiving the Layer 1 measurement reporting configuration in at least one of: the SSB, or a control resource set zero (CORESET0).

Aspect 25: The method of Aspect 23 or Aspect 24, wherein the beam management procedure comprises a network node beam refinement procedure, and wherein the Layer 1 measurement reporting configuration is based at least in part on the network node beam refinement procedure.

Aspect 26: The method of any one of Aspects 23-25, further comprising: generating a Layer 1 measurement report based at least in part on the Layer 1 measurement reporting configuration and the reference signal; and transmitting, prior to receiving the UE-dedicated SIB1, the Layer 1 measurement report.

Aspect 27: The method of any one of Aspects 17-26, wherein receiving the reference signal comprises: receiving the reference signal based at least in part on using a transmission configuration that is associated with: a control resource set zero (CORESET0) configuration, an SSB configuration associated with the SSB, or a RACH configuration associated with the RACH.

Aspect 28: The method of Aspect 27, wherein the transmission configuration comprises at least one of: a bandwidth, or a bandwidth part.

Aspect 29: The method of any one of Aspects 17-28, wherein the beam management procedure comprises a UE receive beam refinement procedure, and wherein receiving the reference signal comprises: receiving, as part of the UE receive beam refinement procedure, the reference signal based at least in part on reference signal repetition being enabled.

Aspect 30: The method of any one of Aspects 17-29, wherein receiving the reference signal comprises: receiving the reference signal based at least in part on reference signal repetition being disabled.

Aspect 31: The method of any one of Aspects 17-30, wherein the reference signal comprises a tracking reference signal with a transmission configuration that is based at least in part on at least one of: a time tracking refinement by the UE, or a frequency tracking refinement by the UE.

Aspect 32: The method of any one of Aspects 17-31, further comprising: receiving a timing configuration indication that specifies a timing delay between at least one of: a reference signal transmission and a Layer 1 report transmission, the reference signal transmission and a control resource set zero (CORESET0), the reference signal transmission and a UE-dedicated SIB1 physical downlink shared channel (PDSCH), the Layer 1 report transmission and the CORESET0, the Layer 1 report transmission and the UE-dedicated SIB1 PDSCH, the CORESET0 and the reference signal transmission, or a physical random access channel and the reference signal transmission.

Aspect 33: The method of any one of Aspects 17-32, further comprising: communicating with a network node based at least in part on a timing delay that is specified at least in part by a communication standard, the timing delay being between at least one of: a reference signal transmission and a Layer 1 report transmission, the reference signal transmission and a control resource set zero (CORESET0), the reference signal transmission and a UE-dedicated SIB1 physical downlink shared channel (PDSCH), the Layer 1 report transmission and the CORESET0, the Layer 1 report transmission and the UE-dedicated SIB1 PDSCH, the CORESET0 and the reference signal transmission, or a physical random access channel and the reference signal transmission.

Aspect 34: The method of any one of Aspects 17-33, wherein the beam management procedure comprises a network node beam refinement procedure, wherein reference signal repetition associated with the reference signal is disabled, and the method further comprises: selecting, prior to receiving the UE-dedicated SIB1, a communication beam based at least in part on the network node beam refinement procedure; indicating, prior to receiving the UE-dedicated SIB1, the communication beam to the network node; and receiving, using the communication beam, a communication based at least in part on a UE-dedicated SIB1 physical downlink shared channel (PDSCH).

Aspect 35: The method of Aspect 34, wherein the communication is a first communication, and the method further comprises: receiving, using the communication beam, a second communication based at least in part on a UE-dedicated control resource set zero (CORESET0).

Aspect 36: The method of Aspect 34 or Aspect 35, wherein receiving the communication using the communication beam comprises: using the communication beam to receive the communication without receiving an instruction from a network node that specifies to use the communication beam.

Aspect 37: The method of Aspect 34 or Aspect 35, further comprising: receiving an instruction from a network node that specifies to use the communication beam to receive the UE-dedicated SIB1 PDSCH, wherein receiving the communication using the communication beam is based at least in part on receiving the instruction from the network node.

Aspect 38: An apparatus for wireless communication at a device, comprising a processor; memory coupled with the processor; and instructions stored in the memory and executable by the processor to cause the apparatus to perform the method of one or more of Aspects 1-16.

Aspect 39: An apparatus for wireless communication at a device, comprising a processor; memory coupled with the processor; and instructions stored in the memory and executable by the processor to cause the apparatus to perform the method of one or more of Aspects 17-37.

Aspect 40: A device for wireless communication, comprising a memory and one or more processors coupled to the memory, the one or more processors configured to perform the method of one or more of Aspects 1-16.

Aspect 41: A device for wireless communication, comprising a memory and one or more processors coupled to the memory, the one or more processors configured to perform the method of one or more of Aspects 17-37.

Aspect 42: An apparatus for wireless communication, comprising at least one means for performing the method of one or more of Aspects 1-16.

Aspect 43: An apparatus for wireless communication, comprising at least one means for performing the method of one or more of Aspects 17-37.

Aspect 44: A non-transitory computer-readable medium storing code for wireless communication, the code comprising instructions executable by a processor to perform the method of one or more of Aspects 1-16.

Aspect 45: A non-transitory computer-readable medium storing code for wireless communication, the code comprising instructions executable by a processor to perform the method of one or more of Aspects 17-37.

Aspect 46: A non-transitory computer-readable medium storing a set of instructions for wireless communication, the set of instructions comprising one or more instructions that, when executed by one or more processors of a device, cause the device to perform the method of one or more of Aspects 1-16.

Aspect 47: A non-transitory computer-readable medium storing a set of instructions for wireless communication, the set of instructions comprising one or more instructions that, when executed by one or more processors of a device, cause the device to perform the method of one or more of Aspects 17-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   a memory; and
   one or more processors coupled to the memory and configured to cause the apparatus to:
      receive, prior to transmitting a user equipment dedicated (UE-dedicated) system information block type 1 (SIB1) associated with a user equipment (UE), a random access channel (RACH) from the UE; and
      transmit, prior to transmitting the UE-dedicated SIB1, prior to transmitting a UE-dedicated control resource set zero (CORESET0), and based at least in part on receiving the RACH, a reference signal that is based at least in part on a beam management procedure.

2. The apparatus of claim 1,
   wherein the one or more processors, to transmit the reference signal, are configured to cause the apparatus to:
      transmit the reference signal based at least in part on a beam used to receive the RACH.

3. The apparatus of claim 1,
   wherein the one or more processors are further configured to:
      transmit a reference signal configuration indication that specifies a transmission configuration associated with the reference signal,
      wherein the one or more processors, to transmit the reference signal, are configured to cause the apparatus to:
         transmit the reference signal based at least in part on the transmission configuration.

4. The apparatus of claim 3,
   wherein the one or more processors, to transmit the reference signal configuration indication, are configured to cause the apparatus to:
      transmit the reference signal configuration indication in a synchronization system block (SSB).

5. The apparatus of claim 3,
   wherein the one or more processors, to transmit the reference signal configuration indication, are configured to cause the apparatus to:

transmit the reference signal configuration indication in the CORESET0.

6. The apparatus of claim 1, wherein the one or more processors are further configured to:
transmit a Layer 1 measurement reporting configuration associated with measuring the reference signal.

7. The apparatus of claim 6, wherein the one or more processors, to transmit the Layer 1 measurement reporting configuration, are configured to cause the apparatus to:
transmit the Layer 1 measurement reporting configuration in at least one of:
a synchronization system block (SSB), or
the CORESET0.

8. The apparatus of claim 1, wherein the reference signal comprises a tracking reference signal with a transmission configuration that is based at least in part on at least one of:
a time tracking refinement by the UE, or
a frequency tracking refinement by the UE.

9. The apparatus of claim 1, wherein the one or more processors are further configured to:
transmit a timing configuration indication that specifies a timing delay between at least one of:
a reference signal transmission and a Layer 1 report transmission,
the reference signal transmission and the CORESET0,
the reference signal transmission and a UE-dedicated SIB1 physical downlink shared channel (PDSCH),
the Layer 1 report transmission and the CORESET0,
the Layer 1 report transmission and the UE-dedicated SIB1 PDSCH,
the CORESET0 and the reference signal transmission, or
a physical random access channel and the reference signal transmission.

10. An apparatus for wireless communication at a user equipment, comprising:
a memory; and
one or more processors, coupled to the memory, configured to:
transmit, prior to receiving a user equipment dedicated (UE-dedicated) system information block type 1 (SIB1), a random access channel (RACH) using a beam that is based at least in part on a synchronization signal block (SSB); and
receive, prior to receiving the UE-dedicated SIB1, prior to receiving a UE-dedicated control resource set zero (CORESET0), and based at least in part on transmitting the RACH, a reference signal that is based at least in part on a beam management procedure.

11. The apparatus of claim 10, wherein the one or more processors, to receive the reference signal, are configured to cause the apparatus to:
receive the reference signal based at least in part on a beam used to transmit the RACH.

12. The apparatus of claim 10, wherein the one or more processors are further configured to:
receive a reference signal configuration indication that specifies a transmission configuration associated with the reference signal,
wherein the one or more processors, to receive the reference signal, are configured to cause the apparatus to:
receive the reference signal based at least in part on the transmission configuration.

13. The apparatus of claim 12, wherein the one or more processors, to receive the reference signal configuration indication, are configured to cause the apparatus to:
receive the reference signal configuration indication in the SSB.

14. The apparatus of claim 12, wherein the one or more processors, to receive the reference signal configuration indication, are configured to cause the apparatus to:
receive the reference signal configuration indication in the CORESET0.

15. The apparatus of claim 10, wherein the one or more processors are further configured to:
receive a Layer 1 measurement reporting configuration associated with measuring the reference signal.

16. The apparatus of claim 15, wherein the one or more processors, to receive the Layer 1 measurement reporting configuration, are configured to cause the apparatus to:
receive the Layer 1 measurement reporting configuration in at least one of:
the SSB, or
CORESET0.

17. The apparatus of claim 15, wherein the beam management procedure comprises a network node beam refinement procedure, and
wherein the Layer 1 measurement reporting configuration is based at least in part on the network node beam refinement procedure.

18. The apparatus of claim 15, wherein the one or more processors are further configured to:
generate a Layer 1 measurement report based at least in part on the Layer 1 measurement reporting configuration and the reference signal; and
transmit, prior to receiving the UE-dedicated SIB1, the Layer 1 measurement report.

19. The apparatus of claim 10, wherein the beam management procedure comprises a network node beam refinement procedure, wherein reference signal repetition associated with the reference signal is disabled, and the one or more processors are further configured to:
select, prior to receiving the UE-dedicated SIB1, a communication beam based at least in part on the network node beam refinement procedure;
indicate, prior to receiving the UE-dedicated SIB1, the communication beam to a network node; and
receive, using the communication beam, a communication based at least in part on a UE-dedicated SIB1 physical downlink shared channel (PDSCH).

20. The apparatus of claim 19, wherein the one or more processors are further configured to:
receive, using the communication beam, a second communication based at least in part on the CORESET0.

21. A method of wireless communication performed by an apparatus of a network node, comprising:
receiving, prior to transmitting a user equipment dedicated (UE-dedicated) system information block type 1

(SIB1) associated with a user equipment (UE), a random access channel (RACH) from the UE; and transmitting, prior to transmitting the UE-dedicated SIB1 and based at least in part on receiving the RACH, a reference signal that is based at least in part on a beam management procedure.

22. The method of claim 21, further comprising:
transmitting a Layer 1 measurement reporting configuration associated with measuring the reference signal.

23. The method of claim 21,
wherein the beam management procedure comprises a UE receive beam refinement procedure, and
wherein transmitting the reference signal comprises:
transmitting, as part of the UE receive beam refinement procedure, the reference signal based at least in part on reference signal repetition being enabled.

24. The method of claim 21,
wherein transmitting the reference signal comprises:
transmitting the reference signal based at least in part on reference signal repetition being disabled.

25. A method of wireless communication performed by an apparatus of a user equipment (UE), comprising:
transmitting, prior to receiving a user equipment dedicated (UE-dedicated) system information block type 1 (SIB1), a random access channel (RACH) using a beam that is based at least in part on a synchronization signal block (SSB); and
receiving, prior to receiving the UE-dedicated SIB1, prior to receiving a UE-dedicated control resource set zero (CORESET0), and based at least in part on transmitting the RACH, a reference signal that is based at least in part on a beam management procedure.

26. The method of claim 25, further comprising:
receiving a Layer 1 measurement reporting configuration associated with measuring the reference signal.

27. The method of claim 26, further comprising:
generating a Layer 1 measurement report based at least in part on the Layer 1 measurement reporting configuration and the reference signal; and
transmitting, prior to receiving the UE-dedicated SIB1, the Layer 1 measurement report.

28. The method of claim 25,
wherein the beam management procedure comprises a UE receive beam refinement procedure, and
wherein receiving the reference signal comprises:
receiving, as part of the UE receive beam refinement procedure, the reference signal based at least in part on reference signal repetition being enabled.

29. The method of claim 25, further comprising:
transmitting the reference signal based at least in part on a beam used to receive the RACH.

30. The method of claim 25, further comprising:
transmitting a reference signal configuration indication that specifies a transmission configuration associated with the reference signal, wherein transmitting the reference signal comprises transmitting the reference signal based at least in part on the transmission configuration.

* * * * *